(12) United States Patent
Garcia

(10) Patent No.: US 12,079,837 B2
(45) Date of Patent: *Sep. 3, 2024

(54) METHOD, APPARATUS, AND COMPUTER PROGRAM PRODUCT FOR SEARCHING FOR PROMOTIONS

(71) Applicant: Bytedance Inc., Wilmington, DE (US)

(72) Inventor: Rebeca Minguela Garcia, Seattle, WA (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,526

(22) Filed: Jan. 25, 2023

(65) Prior Publication Data
US 2023/0351444 A1    Nov. 2, 2023

Related U.S. Application Data

(63) Continuation of application No. 17/303,874, filed on Jun. 9, 2021, now Pat. No. 11,593,838, which is a
(Continued)

(51) Int. Cl.
*G06Q 30/00* (2023.01)
*G06Q 30/0251* (2023.01)
(Continued)

(52) U.S. Cl.
CPC ..... *G06Q 30/0257* (2013.01); *G06Q 30/0259* (2013.01); *G06Q 30/0261* (2013.01); *G06Q 50/14* (2013.01)

(58) Field of Classification Search
CPC ........... G06Q 30/0257; G06Q 30/0259; G06Q 30/0261; G06Q 50/14
See application file for complete search history.

(56) References Cited

U.S. PATENT DOCUMENTS 9,020,528 B2    4/2015   Hurowitz et al.
2002/0038246 A1   3/2002   Nagaishi
(Continued)

OTHER PUBLICATIONS

"Service platform for rapid development and deployment of context-aware, mobile applications". IEEE. 2005. (Year: 2005).*
(Continued)

*Primary Examiner* — Maria V Vanderhorst
(74) *Attorney, Agent, or Firm* — Alston & Bird LLP

(57) ABSTRACT

Methods, apparatuses, and computer program products are provided herein for improving consumer interactions with Marketing and Promotion Service systems. In one embodiment, a method for searching for promotions is provided which includes accessing a map to be displayed to a consumer; receiving input comprising a time period; and receiving input comprising a circumscribed region on a map, wherein the circumscribed region provides an indication of an area in which the consumer is planning to travel. The method further includes searching, by a processor, for promotions within the circumscribed region that are redeemable during the time period and generating an impression comprising one or more promotions returned from the searching for promotions, wherein the impression includes at least one promotion related to travel. A corresponding apparatus and computer program product are also provided.

20 Claims, 15 Drawing Sheets

Related U.S. Application Data continuation of application No. 14/628,995, filed on Feb. 23, 2015, now Pat. No. 11,068,936.

(60) Provisional application No. 61/943,737, filed on Feb. 24, 2014.

(51) Int. Cl.
*G06Q 50/14* (2012.01)
*G05B 19/418* (2006.01)

(56) References Cited

U.S. PATENT DOCUMENTS

| | | | |
|---|---|---|---|
| 2004/0073538 A1* | 4/2004 | Leishman | G06F 16/9537 |
| 2007/0282687 A1 | 12/2007 | Laves | |
| 2008/0154714 A1 | 6/2008 | Liu et al. | |
| 2008/0313039 A1 | 12/2008 | Altberg et al. | |
| 2009/0276307 A1 | 11/2009 | Griffith et al. | |
| 2010/0250359 A1 | 9/2010 | Gillenson et al. | |
| 2010/0256902 A1 | 10/2010 | Coch et al. | |
| 2011/0022423 A1* | 1/2011 | Shank | G06Q 30/0239 |
| | | | 707/E17.014 |
| 2012/0204112 A1 | 8/2012 | Levine et al. | |
| 2013/0030918 A1 | 1/2013 | Mourya et al. | |
| 2013/0060631 A1 | 3/2013 | Corson et al. | |
| 2013/0073336 A1* | 3/2013 | Heath | G06Q 30/02 |
| | | | 705/7.29 |
| 2013/0132846 A1 | 5/2013 | Martin | |
| 2013/0238658 A1* | 9/2013 | Burris | G06F 16/2471 |
| | | | 707/770 |
| 2013/0325979 A1 | 12/2013 | Mansfield et al. | |
| 2014/0365901 A1 | 12/2014 | Moha et al. | |
| 2015/0100398 A1 | 4/2015 | Narayanaswami et al. | |
| 2015/0358790 A1 | 12/2015 | Nasserbakht | |
| 2016/0294958 A1 | 10/2016 | Zhang et al. | |

OTHER PUBLICATIONS

An Architecture and Business Model for Making Software Agents Commercially Viable. IEEE. (Year: 2005).*

University of Chicago, Decision Making Under Ambiguity, The Journal of Business, Oct. 1986 vol. 59 No. 4 Part 2, Hillel Einhorn and Robin Hogarth (Year: 1986).

Wiley Encyclopedia of Computer Science and Engineering (2009) at least p. 125. Transaction Processing (Year: 2009).

* cited by examiner

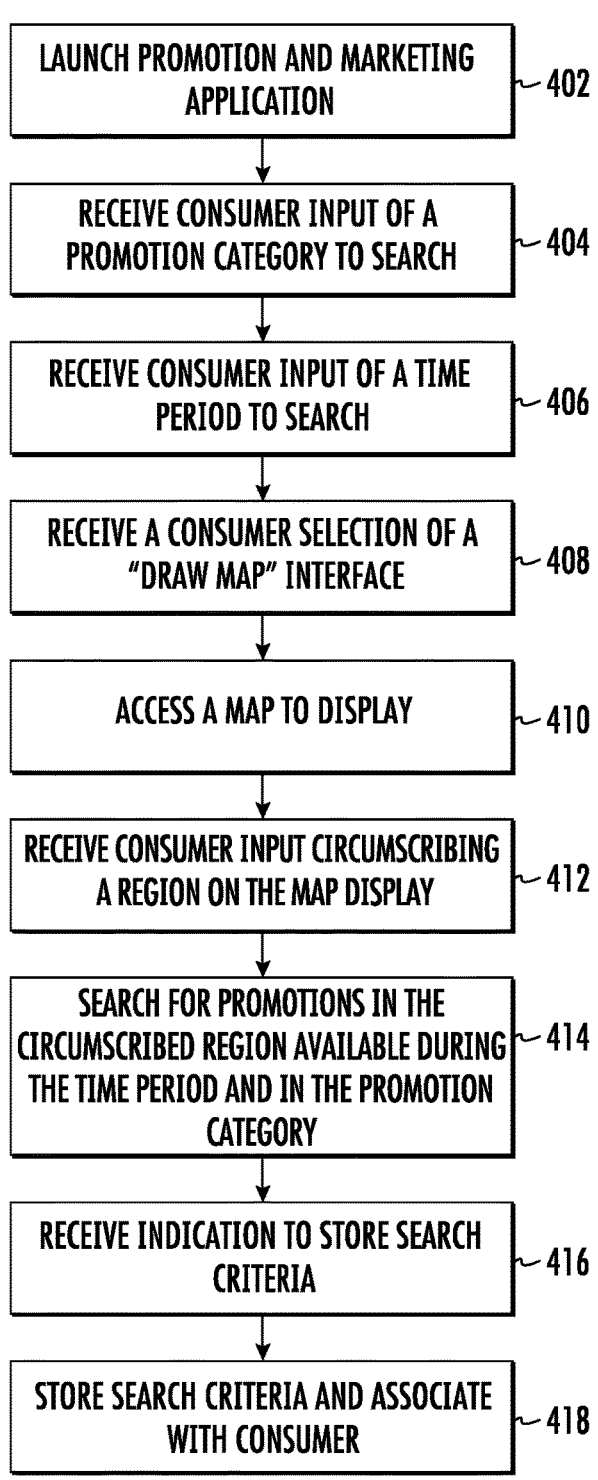
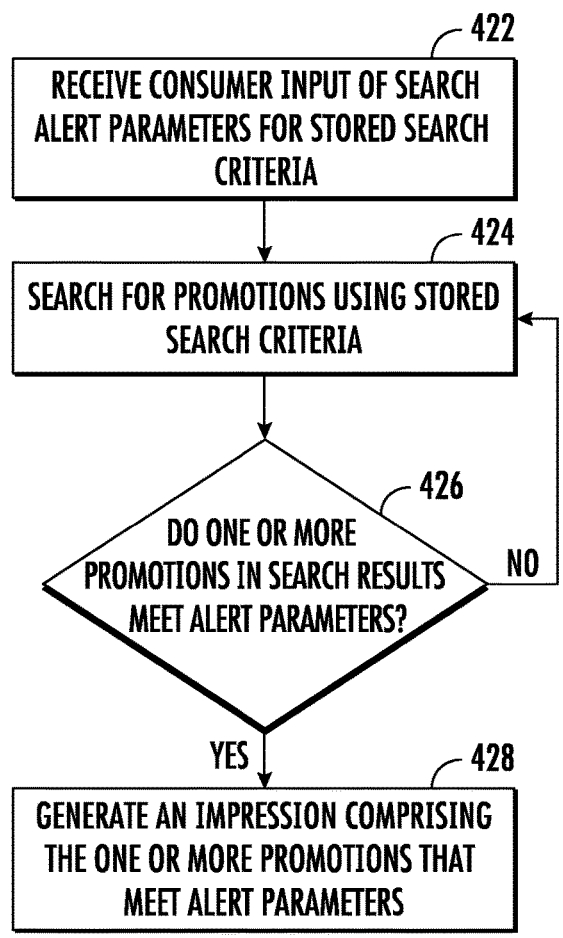
FIG. 4A
FIG. 4B

METHOD, APPARATUS, AND COMPUTER PROGRAM PRODUCT FOR SEARCHING FOR PROMOTIONS

CROSS REFERENCES TO RELATED APPLICATIONS

The present application is a continuation of U.S. Non-Provisional application Ser. No. 17/303,874, filed Jun. 9, 2021 and titled "Method, Apparatus, and Computer Program Product for Searching for Promotions," which is a continuation of U.S. Non-Provisional application Ser. No. 14/628,995 filed Feb. 23, 2015 and titled "Method, Apparatus, and Computer Program Product for Searching for Promotions," which claims the benefit of U.S. Provisional Application No. 61/943,737, filed Feb. 24, 2014 and titled, "Method, Apparatus, and Computer Program Product for Searching for Promotions," each of which is incorporated herein by reference in its entirety.

FIELD

Embodiments of the invention relate, generally, to facilitating promotion searches by a consumer within a promotion and marketing service application.

BACKGROUND

Marketing and promotion services seek to encourage consumers to explore and discover available promotions that the consumer may be interested in, and as a result provide a variety of methods for a consumer to search available promotions. Consumers are increasingly using mobile devices and applications to search for and order such promotions. As a result, there is a need to provide more intuitive methods for consumers to seek out available promotions. In this regard, a number of deficiencies and problems associated with the systems used to, among other things, provide consumers with information about available promotions have been identified. Through applied effort, ingenuity, and innovation, many of these identified problems have been solved by developing solutions that are included in embodiments of the present invention, some examples of which are described herein.

BRIEF SUMMARY

Accordingly, a method, apparatus, and computer program product are provided for improving consumer interactions with Marketing and Promotion Service systems.

A method is provided for searching for promotions, the method including: accessing a map to be displayed to a consumer; receiving input comprising a time period; and receiving input comprising a circumscribed region on a map, wherein the circumscribed region provides an indication of an area in which the consumer is planning to travel. The method further including searching, by a processor, for promotions within the circumscribed region that are redeemable during the time period and generating an impression comprising one or more promotions returned from the searching for promotions, wherein the impression includes at least one promotion related to travel.

In some embodiments, the method further includes accessing the map based on a current location of the consumer. In some embodiments, the method further includes accessing the map based on receiving location parameters from the consumer.

In some embodiments, the method further includes receiving input comprising a plurality of circumscribed regions on a map and searching for promotions within the plurality of circumscribed regions.

In some embodiments, the method further includes determining a plurality of coordinate points on the boundary of the circumscribed region and defining a search criteria for available promotions as being within the area described by the plurality of coordinate points.

In some embodiments, the method further includes receiving input comprising a promotion category and searching for promotions within the circumscribed region based on the promotion category.

In some embodiments, the method further includes receiving an indication to store search criteria comprising the circumscribed region, time period, and promotion category; storing the search criteria; and associating the stored search criteria with the consumer.

In some embodiments, the method further includes receiving alert parameters defined for the stored search criteria; searching for promotions on a periodic basis using the stored search criteria; determining if the alert parameters are met for one or more promotions returned from the searching for promotions; and if the alert parameters are met, generating an impression comprising one or more promotions for which the alert parameters are met.

In some embodiments, the promotions comprise travel-related promotions. In some embodiments, the travel-related promotions comprise one or more of: promotions for lodging paired with methods of travel to an area; promotions for activities paired with lodging or travel to an area; promotions for dining paired with lodging or travel to an area; promotions for services paired with lodging or travel to an area; and promotions for goods paired with lodging or travel to an area.

In some embodiments, the promotion categories may comprise categories of different types of travel experiences.

An apparatus is provided comprising at least one processor and at least one memory including computer-executable program instructions, the at least one memory and the computer-executable program instructions configured to, with the at least one processor, cause the apparatus to at least: access a map to be displayed to a consumer; receive input comprising a time period; receive input comprising a circumscribed region on a map, wherein the circumscribed region provides an indication of an area in which the consumer is planning to travel; search for promotions within the circumscribed region that are redeemable during the time period; and generate an impression comprising one or more promotions returned from the searching for promotions, wherein the impression includes at least one promotion related to travel.

In some embodiments, the apparatus further comprises the at least one memory and the computer-executable program instructions configured to, with the at least one processor, cause the apparatus to access the map based on a current location of the consumer. In some embodiments, the apparatus further comprises the at least one memory and the computer-executable program instructions configured to, with the at least one processor, cause the apparatus to access the map based on receiving location parameters from the consumer.

In some embodiments, the apparatus further comprises the at least one memory and the computer-executable program instructions configured to, with the at least one processor, cause the apparatus to receive input comprising a plurality of circumscribed regions on a map and search for promotions within the plurality of circumscribed regions.

In some embodiments, the apparatus further comprises the at least one memory and the computer-executable program instructions configured to, with the at least one processor, cause the apparatus to determine a plurality of coordinate points on the boundary of the circumscribed region and define a search criteria for available promotions as being within the area described by the plurality of coordinate points.

In some embodiments, the apparatus further comprises the at least one memory and the computer-executable program instructions configured to, with the at least one processor, cause the apparatus to receive input comprising a promotion category and search for promotions within the circumscribed region based on the promotion category.

In some embodiments, the apparatus further comprises the at least one memory and the computer-executable program instructions configured to, with the at least one processor, cause the apparatus to receive an indication to store search criteria comprising the circumscribed region, time period, and promotion category; store the search criteria; and associate the stored search criteria with the consumer.

In some embodiments, the apparatus further comprises the at least one memory and the computer-executable program instructions configured to, with the at least one processor, cause the apparatus to receive alert parameters defined for the stored search criteria; search for promotions on a periodic basis using the stored search criteria; determine if the alert parameters are met for one or more promotions returned from the searching for promotions; and if the alert parameters are met, generate an impression comprising one or more promotions for which the alert parameters are met.

In some embodiments, the promotions are travel-related promotions. In some embodiments, the travel-related promotions comprise one or more of: promotions for lodging paired with methods of travel to an area; promotions for activities paired with lodging or travel to an area; promotions for dining paired with lodging or travel to an area; promotions for services paired with lodging or travel to an area; and promotions for goods paired with lodging or travel to an area.

In some embodiments, the promotion categories comprise categories of different types of travel experiences.

A computer program product is provided comprising at least one non-transitory computer-readable storage medium having computer-executable program instructions stored therein, the computer-executable program instructions comprising program instructions, when executed by a processor, configured to: access a map to be displayed to a consumer; receive input comprising a time period; receive input comprising a circumscribed region on a map, wherein the circumscribed region provides an indication of an area in which the consumer is planning to travel; search for promotions within the circumscribed region that are redeemable during the time period; and generate an impression comprising one or more promotions returned from the searching for promotions, wherein the impression includes at least one promotion related to travel.

In some embodiments, the computer program product further comprises program instructions configured to access the map based on a current location of the consumer. In some embodiments, the computer program product further comprises program instructions configured to access the map based on receiving location parameters from the consumer.

In some embodiments, the computer program product further comprises program instructions configured to receive input comprising a plurality of circumscribed regions on a map and search for promotions within the plurality of circumscribed regions.

In some embodiments, the computer program product further comprises program instructions configured to determine a plurality of coordinate points on the boundary of the circumscribed region and define a search criteria for available promotions as being within the area described by the plurality of coordinate points.

In some embodiments, the computer program product further comprises program instructions configured to receive input comprising a promotion category and search for promotions within the circumscribed region based on the promotion category.

In some embodiments, the computer program product further comprises program instructions configured to receive an indication to store search criteria comprising the circumscribed region, time period, and promotion category; store the search criteria; and associate the stored search criteria with the consumer.

In some embodiments, the computer program product further comprises program instructions configured to receive alert parameters defined for the stored search criteria; search for promotions on a periodic basis using the stored search criteria; determine if the alert parameters are met for one or more promotions returned from the searching for promotions; and if the alert parameters are met, generate an impression comprising one or more promotions for which the alert parameters are met.

In some embodiments, the promotions are travel-related promotions. In some embodiments, the travel-related promotions comprise one or more of: promotions for lodging paired with methods of travel to an area; promotions for activities paired with lodging or travel to an area; promotions for dining paired with lodging or travel to an area; promotions for services paired with lodging or travel to an area; and promotions for goods paired with lodging or travel to an area.

In some embodiments, the promotion categories comprise categories of different types of travel experiences.

BRIEF DESCRIPTION OF THE SEVERAL VIEWS OF THE DRAWINGS

Figure 1:
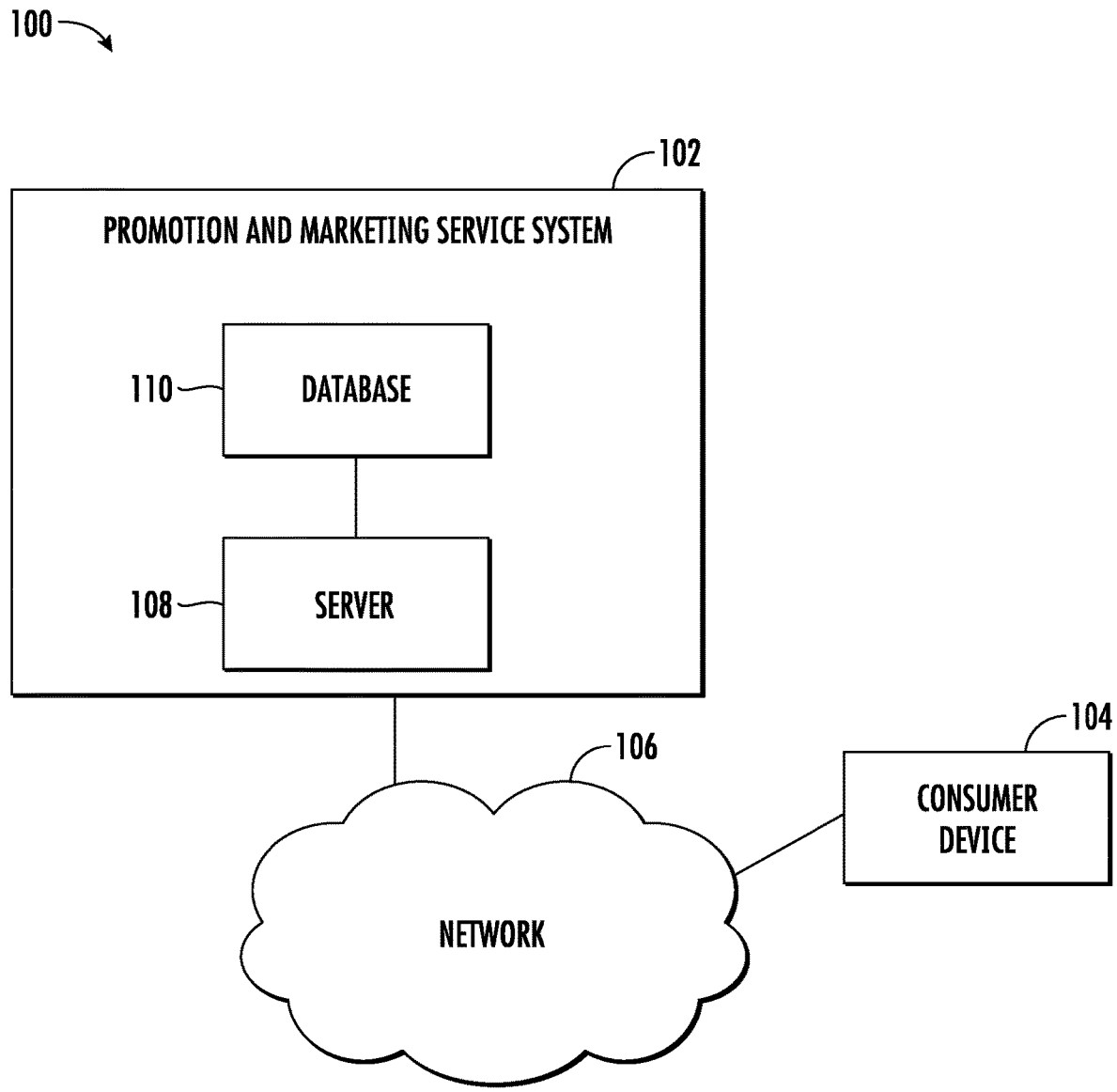
Figure 2:
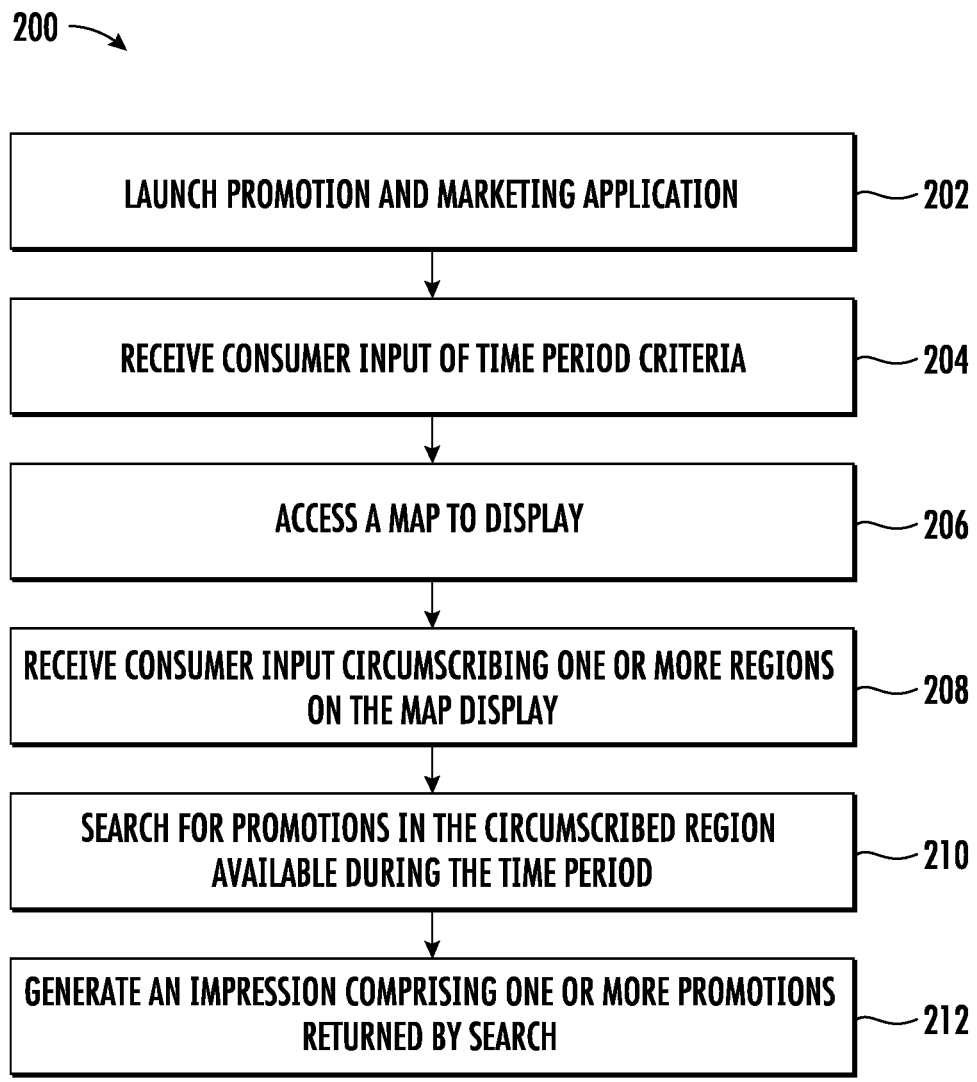
Figure 3:
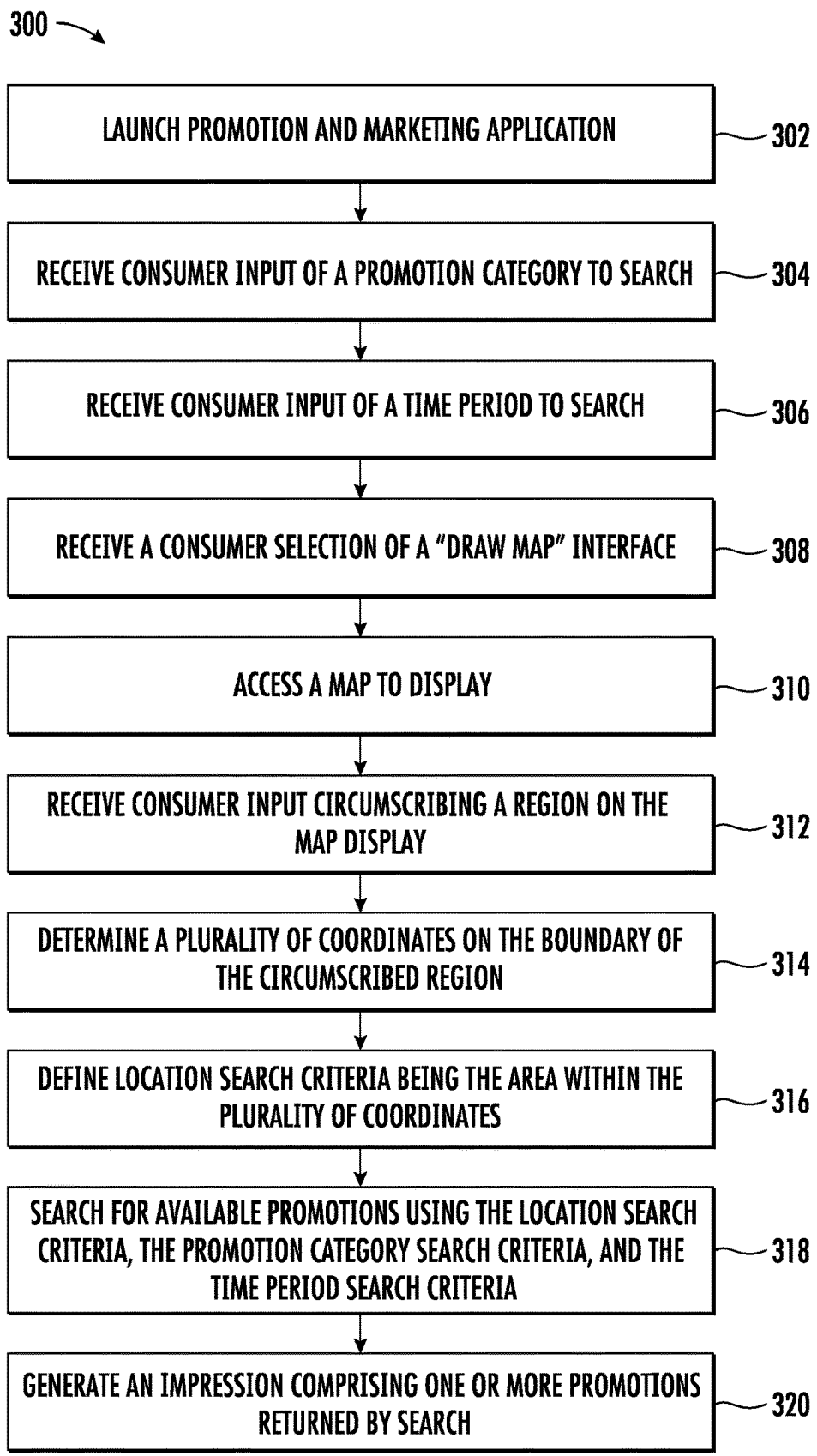
Figure 23:
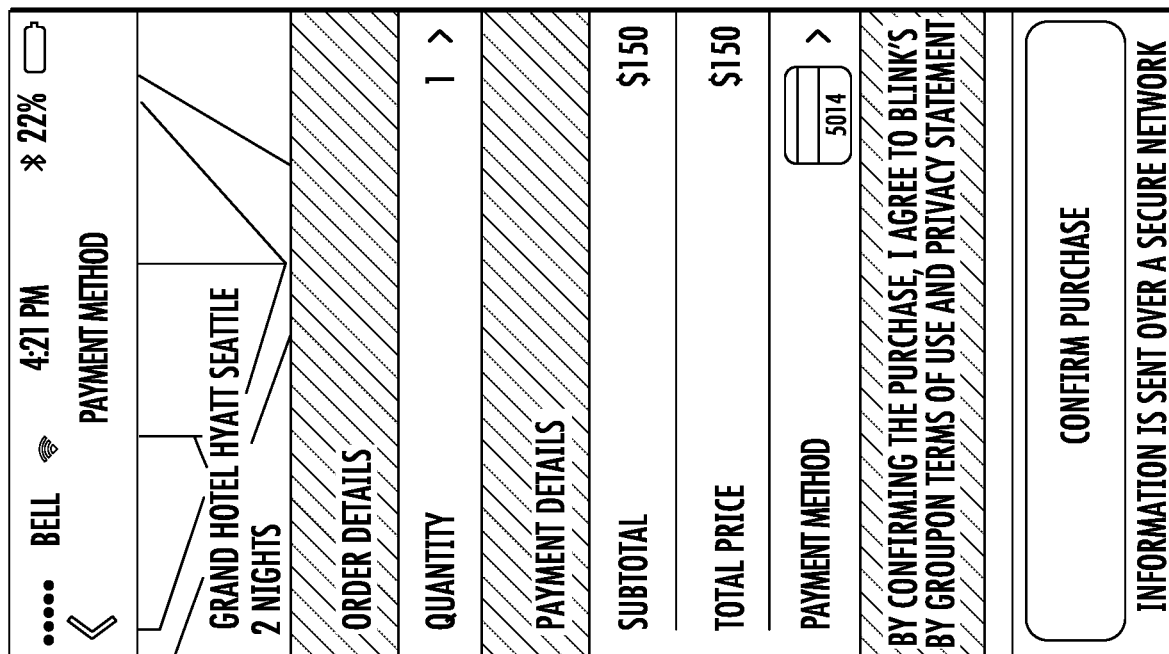
Figure 24:
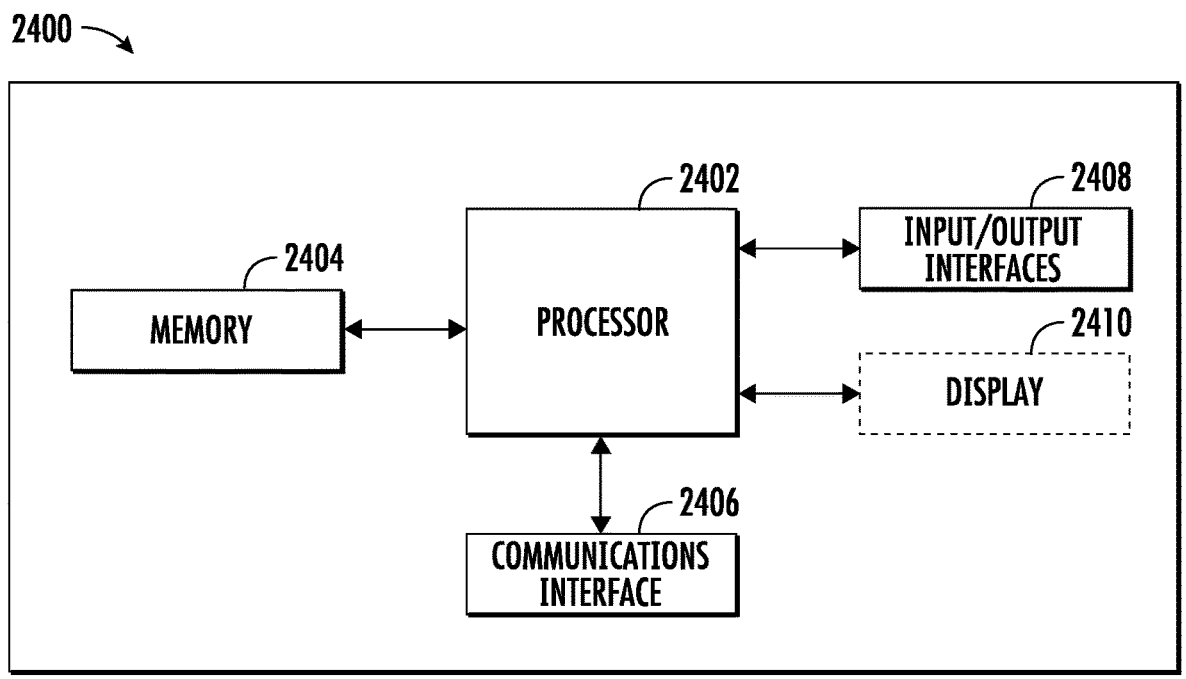

Having thus described embodiments of the invention in general terms, reference will now be made to the accompanying drawings, which are not necessarily drawn to scale, and wherein:

FIG. 1 illustrates an example system within which embodiments of the present invention may operate;

FIG. 2 illustrates a flowchart describing example operations facilitating searching for promotions in accordance with some example embodiments discussed herein;

FIG. 3 illustrates another flowchart describing example operations for searching for promotions in accordance with some example embodiments discussed herein;

FIGS. 4A-4B illustrate flowcharts describing example operations for storing searches and providing alerts for promotions meeting search criteria in accordance with some example embodiments discussed herein;

FIGS. 5-23 illustrate some example graphical user interface displays that may be presented by various components of systems or devices in accordance with some example embodiments discussed herein; and FIG. 24 illustrates a block diagram of an example device providing operations in accordance with some example embodiments discussed herein.

DETAILED DESCRIPTION

Glossary

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

As used herein, the term "promotion and marketing service" refers to a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent, and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the terms "provider" and "merchant" may be used interchangeably and refers to a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" refers to a client, customer, purchaser, shopper, user, or the like, who may be in the position to or does exchange value for one or more instruments under the terms defined by one or promotions. For example, and using the aforementioned running company as the example provider, a consumer may be an individual who is interested in purchasing running shoes.

As used herein, the term "consumer interface" refers to any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" refers to any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters, and/or the like. Using the running company promotion as an example, the accepted value is $25 and the promotional value is $50. In this example, the residual value may be equal to the accepted value.

As used herein, the term "impression" refers to a communication, a display, or other perceived indication, such as a flyer, print media, e-mail, text message, application alert, mobile applications, mobile notifications, other type of electronic interface or distribution channel, and/or the like, of one or more promotions. For example, and using the aforementioned running company as the example provider, an e-mail communication sent to consumers that indicates the availability of a promotion of $25 for $50 toward running shoes.

As used herein, the term "instrument" refers to any type of gift card, tender, electronic certificate, medium of exchange, voucher, or the like, that embodies the terms of the promotion from which it results and which may be used toward at least a portion of the purchase, acquisition, procurement, consumption, or the like, of goods, services and/or experiences. In some examples, an instrument may take the form of tender that has a given value that is exchangeable for goods, services and/or experiences and/or a reduction in a purchase price of a particular good, service, or experience. In some examples, the instrument may have multiple values, such as an accepted value, a promotional value, and/or a residual value. For example, using the aforementioned running company as the example provider, an instrument may comprise an electronic indication in a mobile application that shows $50 of value to spend at the running company. In some examples, the accepted value of the instrument is defined by the value exchanged for the instrument. In some examples, the promotional value of the instrument is defined by the promotion from which the instrument resulted and is the value of the instrument beyond the accepted value. In some examples, the residual value of the instrument is the value after redemption, the value after the expiry or other violation of a redemption parameter, the return or exchange value of the instrument, or the like.

As used herein, the term "redemption" refers to the use, exchange or other presentation of an instrument for at least a portion of a good, service, or experience as defined by the instrument and its related offer. In some examples, redemption includes the verification of validity of the instrument. In other example embodiments, redemption may include an indication that a particular instrument has been redeemed and thus no longer retains an actual, promotional, and/or residual value (e.g., full redemption). In other example embodiments, redemption may include the redemption of at least a portion of an instrument's actual, promotional, and/or residual value (e.g., partial redemption). An example of redemption, using the aforementioned running company as the example provider, is exchanging a $50 instrument and $50 for a $100 pair of running shoes.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

A method, apparatus, and computer program product are provided in accordance with an example embodiment of the present invention in order to improve the ability to search for and ultimately purchase promotions in a promotion and marketing service system. For example, FIGS. 5-23, detailed below, show example displays that may be presented by one or more display screens of one or more machines, which may sometimes be referred to as "devices", "mobile devices", "consumer devices", or the like, in accordance with some embodiments discussed herein. For example, the displays of FIGS. 5-23 can be presented to a consumer by a consumer device (such as a smart phone, tablet computer, laptop computer, wearable computing device, etc.) and can aid in facilitating a search for available promotions by the consumer, e.g., travel promotions, lodging promotions, event/activity promotions, dining promotions, etc. The promotion and marketing service system may thereby be improved by enabling an increase in the sales of promotions and/or goods by facilitating targeted searches for available promotions by the consumer.

The displays of FIGS. 5-23 can be used to provide a relatively simple, quick, and intuitive way for the consumer to search for and purchase available promotions, such as in the vicinity of the consumer's current location or in a location to which the consumer is planning to travel. In some example embodiments, the consumer may use the displays of FIGS. 5-23 to plan, schedule, and purchase a travel, experience, or other promotion or combination of promotions. For example, a consumer may select a particular geographic area in which to travel, the systems and methods described herein may then operate to align, organize, or otherwise combine one or more promotions to facilitate such travel. In some cases, the travel may include airfare, railfare, or the like, lodging, services such as a massage or a restaurant reservation, one or more goods, or the like. Embodiments of the present invention may further improve the promotion and marketing service system by providing an intuitive and relatively simple location search interface.

In one particular example embodiment, a map may accept a drawn travel area or multiple drawn travel areas as part of the input to the searching system described herein and with reference to FIGS. 5-23. In one such example, a consumer may draw one or more search areas into which they would like to travel. In response, the system may provide one or more recommendations to facilitate such travel in the form of one or more promotions.

System Architecture

FIG. 1 illustrates a system 100 which provides an example network architecture for a Promotion and Marketing Service, which may include one or more devices and subsystems that are configured to implement embodiments discussed herein. For example, system 100 may include Promotion and Marketing Service system 102, which may include, for example, promotion analytics and promotion databases, along with other elements. Promotion analytics may include any suitable network server and/or other type of processing device to provide analysis of provider promotions, transaction data, etc. to facilitate the generation and marketing of promotions. Promotional databases may include any suitable network databases configured to store provider and consumer data, promotion data, transaction data, redemption data, and/or the like, such as that discussed herein. In this regard, Promotion and Marketing Service system 102 may include, for example, at least one backend data server, network database, cloud computing device, or the like, among other elements.

For example, the Promotion and Marketing Service system 102 may comprise a server 108 in communication with a database 110. The server 108 may be embodied as a computer or computers as known in the art. The server 108 may provide for receiving of electronic data from various sources, including but not necessarily limited to the consumer devices 104. For example, the server 108 may be operable to receive and process clickstream data provided by the consumer devices 104. The server 108 may also facilitate e-commerce transactions based on transaction information provided by the consumer devices 104. The server 108 may facilitate the generation and providing of various electronic communications and marketing materials based on the received electronic data.

The database 110 may be embodied as a data storage device such as a Network Attached Storage (NAS) device or devices, or as a separate database server or servers. The database 110 includes information accessed and stored by the server 108 to facilitate the operations of the Promotion and Marketing Service system 102. For example, the database 110 may include, without limitation, user account credentials for system administrators, merchants, and consumers, data indicating the products and promotions offered by the promotion and marketing service, clickstream data, analytic results, reports, financial data, and/or the like.

In some embodiments, the Promotion and Marketing Service system 102 may support applications executed on consumer devices 104 that may facilitate providing impressions to the consumer regarding one or more promotions, assist the consumer in searching for available promotions, purchasing promotions, managing purchased promotions, and the like. In some embodiments, the Promotion and Marketing Service system 102 may support providing impressions for travel promotions, lodging promotions, dining promotions, event/activity promotions, goods promotions, and the like.

Promotion and Marketing Service system 102 may be coupled to one or more consumer devices 104, such as via network 106. In this regard, network 106 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 106 may include a cellular telephone, 802.11, 802.16, 802.20, and/or WiMax network. Further, the network 106 may include a public network, such as the Internet, a private network, such as an intranet, or combinations thereof, and may utilize a variety of networking protocols now available or later developed including, such as, but not limited to, TCP/IP based networking protocols.

Consumer device 104 may be implemented as a personal computer and/or other networked device, such as a cellular phone, tablet computer, laptop computer, mobile device, etc., that may be used for any suitable purpose in addition to searching for promotions, processing transactions, and the like. While FIG. 1 illustrates a single consumer device 104, a plurality of consumer devices may be in communication with the Promotion and Marketing Service system 102. In some embodiments, consumer device 104 may be configured to provide graphical user interfaces, such as illustrated in FIGS. 5-23, to facilitate consumer interactions with Marketing and Promotion Service systems, including searching for and purchasing one or more promotions.

For example, in one embodiment the Promotion and Marketing Service system 102 may support a travel application that provides impressions to consumers regarding travel and lodging promotions, as well as other promotions associated with the travel location.

General Description of Example Travel Application

Figure 5:
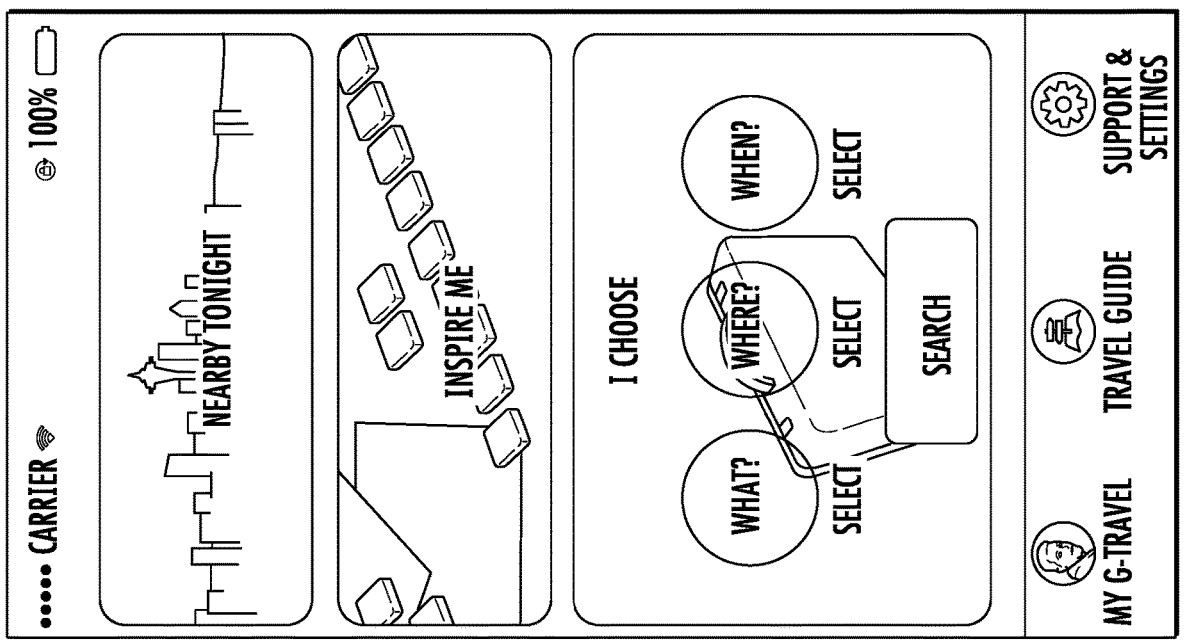

In some embodiments, the application may allow for a consumer to locate "last minute" promotions, for example, promotions that are available nearby the consumers current location (e.g., by selecting "Nearby Tonight" of FIG. 5). The application may also allow for a consumer to review travel promotions curated by the Promotion and Marketing Service (e.g., by selecting "Inspire Me" of FIG. 5). The application may also allow for a consumer to input criteria to use for searching available promotions. In some embodiments, the application may allow for a consumer to provide input for one or more of category, time period, and location of promotion to use as criteria for searching for available promotions. Alternatively or additionally, the application may search for particular combinations of promotions and travel, combinations of times of availability, combinations including class of service, and/or the like.

Figure 6:
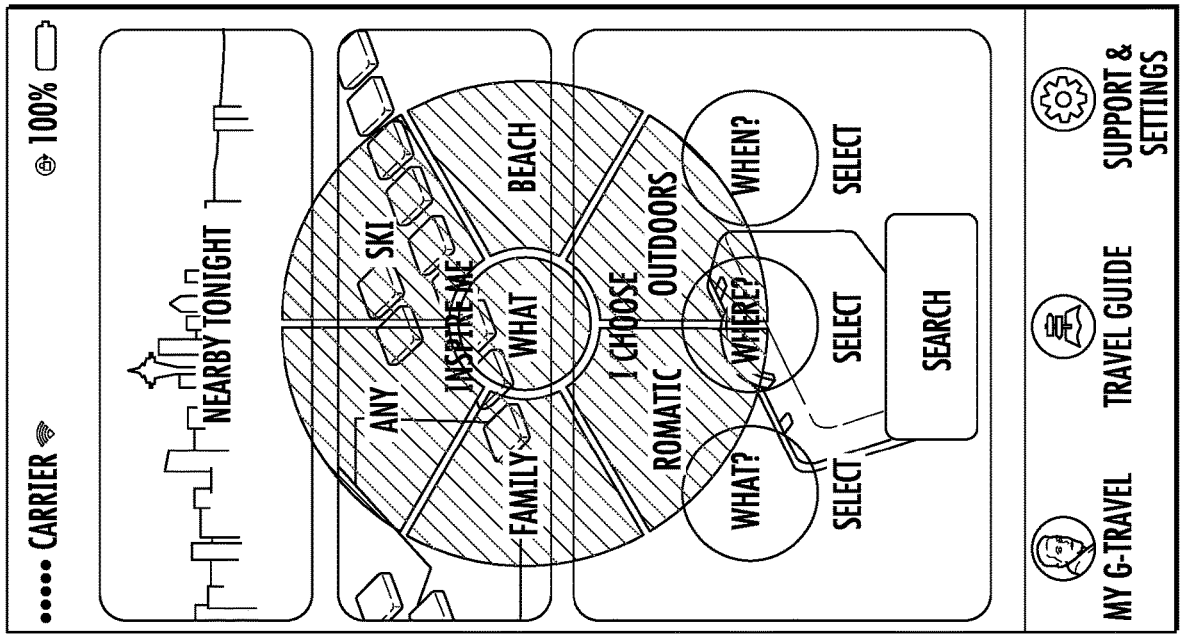

For example, in some embodiments, the application may provide for the consumer to indicate a category of promotions to search as part of the search criteria, e.g., ski vacation promotions, beach vacation promotions, outdoors vacation promotions, family vacation promotions, any promotions, etc. Such exemplary categories are shown with respect to FIG. 6. FIG. 6 illustrates an exemplary input screen allowing a consumer to indicate a promotion category to use in defining the promotion search criteria.

Figure 7:
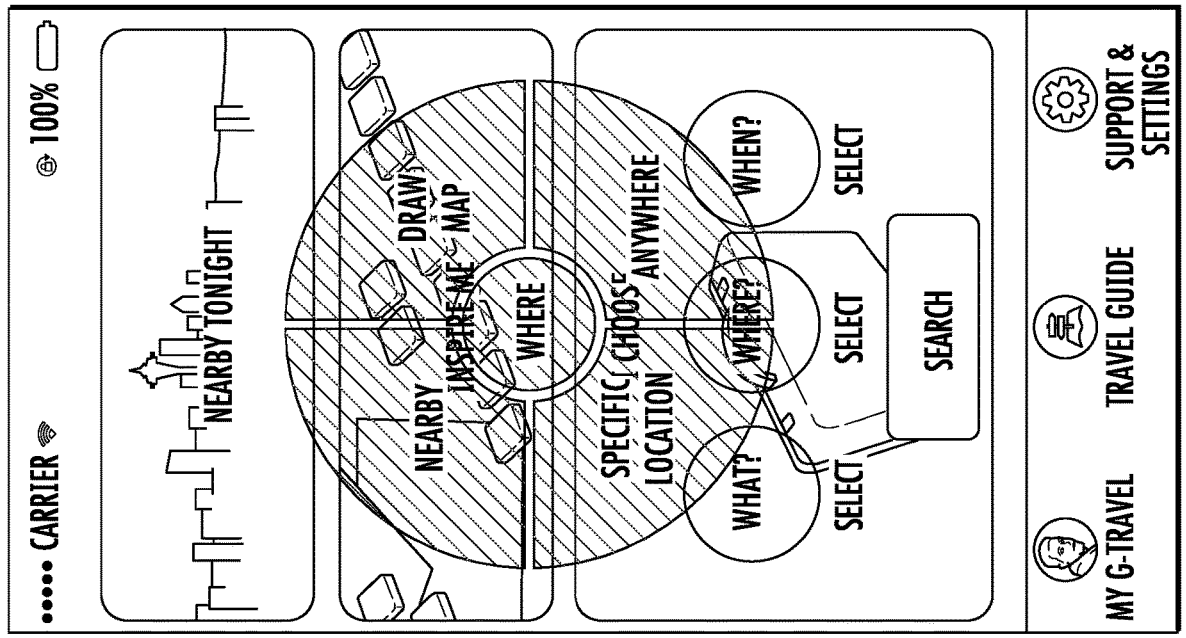

In some embodiments, the application may also provide for the consumer to indicate a period in which the promotion may be redeemed as part of the search criteria. For example, the application may allow the consumer to define a begin date and end date of a date range, a specific date, an upcoming weekend, or "anytime" period to use as part of the search criteria. In some embodiments, the application may allow the consumer to define one or more date range periods and further indicate that the consumer would like to search for a promotion for any x number of days period with one of date range periods (e.g., the consumer may be able to indicate that they would like to search for a 3-day hotel stay within one of two five day periods within a particular month). An example of date ranges is shown with respect to FIG. 7. FIG. 7 illustrates an exemplary input screen allowing a consumer to indicate a time period to use in defining the promotion search criteria.

Figure 8:
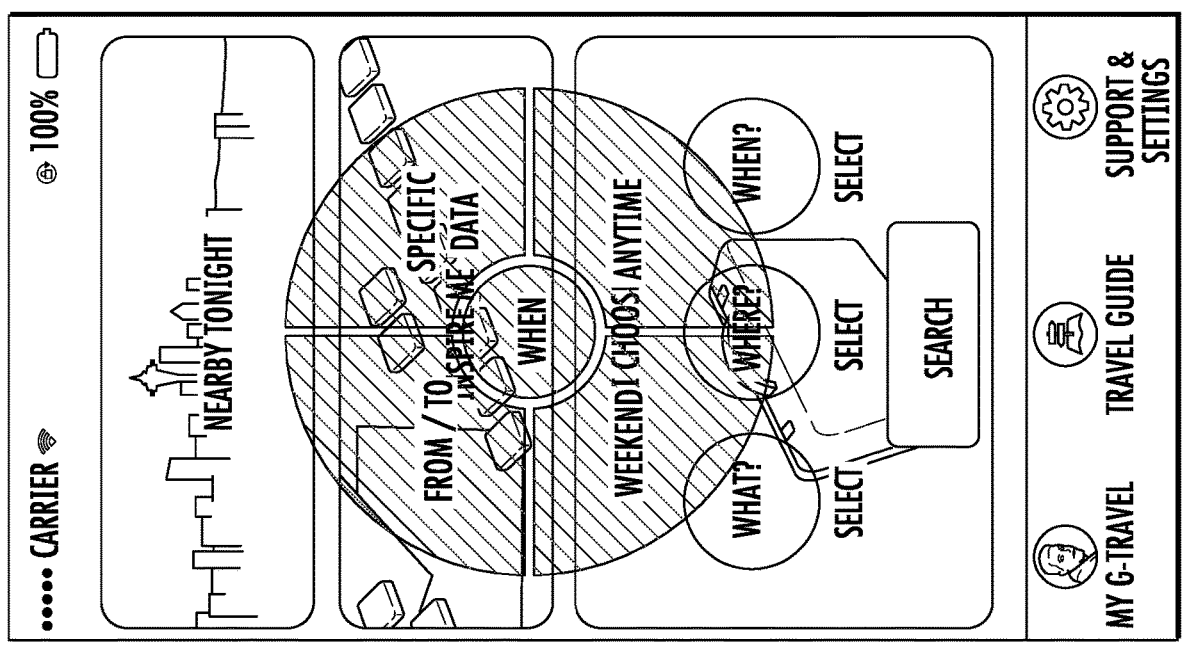
Figure 10:
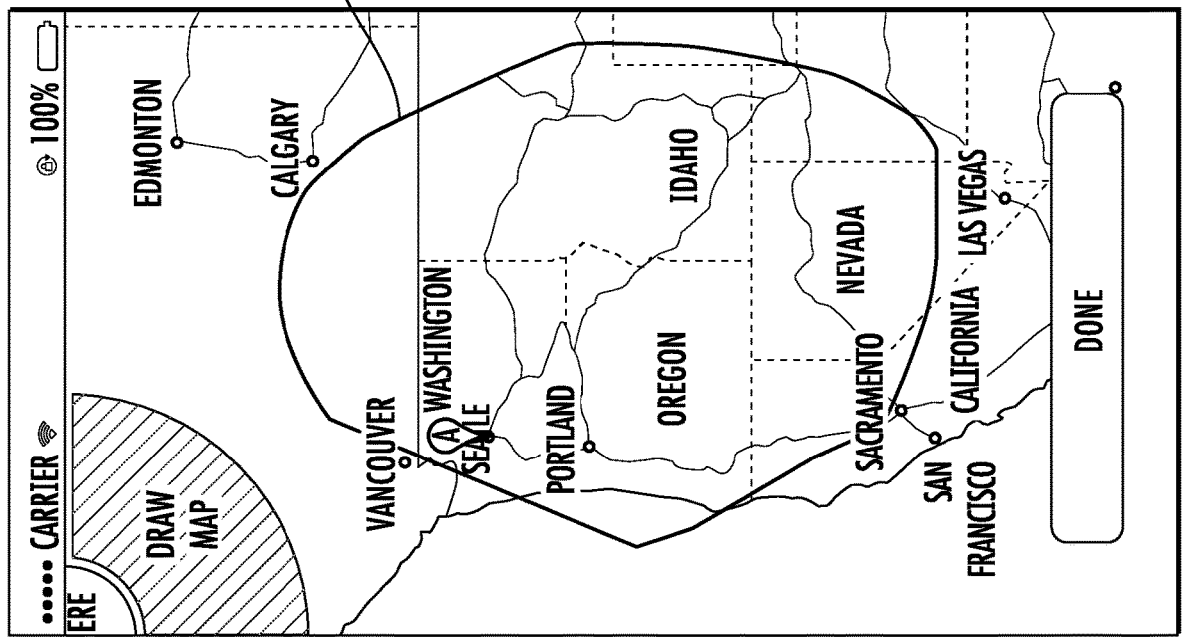
Figure 9:
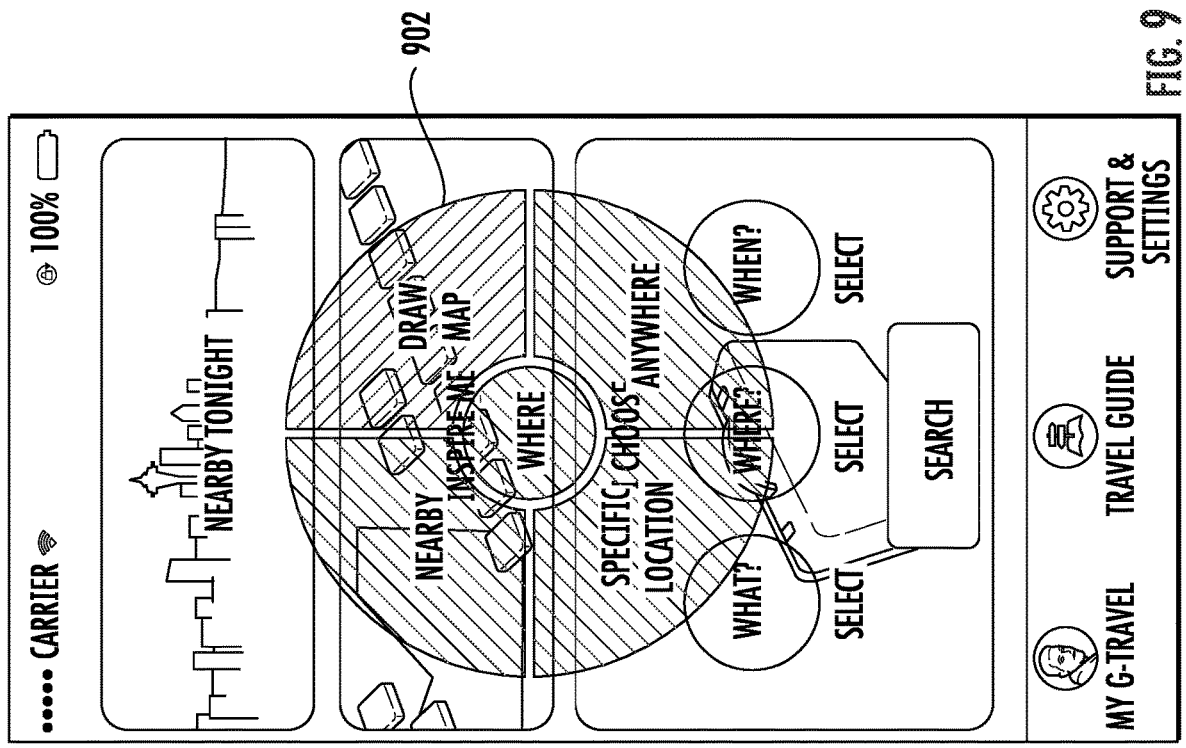

In some embodiments, the application may also provide for the consumer to indicate a location to use as part of the search criteria. For example, the consumer may be able to indicate or otherwise request to search for promotions nearby the consumer's current location, to search for promotions in a specific location (e.g., regions, state, city, neighborhood, etc.), to search for promotions anywhere, or, advantageously, the consumer may be able to draw an area on a map that should be used as the location search criteria. One example of a drawing tool is shown with respect to FIGS. 8 through 10. FIGS. 8 through 10 illustrate exemplary input screens allowing a consumer to indicate a location to use in defining the promotion search criteria.

In some examples, the drawing tool may access a map that lists or illustrates particular geographic areas. In such cases, one or more areas may be selected based on the shape or shapes drawn. In other examples, the input may be provided by circling or otherwise drawing a shape around other data, such as image data, representations of map data, flight maps, cruise routes, representations of cities, particular terrain features like mountains or beaches, and/or the like.

FIG. 2 illustrates a flowchart of exemplary operations for a process 200 that may be executed by one or more apparatuses to facilitate consumer searching for available promotions, in accordance with some example embodiments discussed herein. Operations of process 200 may begin at block 202 upon a consumer launching an application associated with a Promotion and Marketing Service system (e.g., Promotion and Marketing Service system 102) via a consumer device (e.g., consumer device 104). One such example of an initial launch screen is shown with respect to FIG. 5. FIG. 5 illustrates an exemplary initial launch screen for an application facilitating consumer searches for travel-related promotions.

At block 204, input of a time period may be received, such as a specific date, date range, or type of period (e.g. weekend), to be used in searching for available promotions, for example, using means such as input/output interfaces 2408, display 2410, processor 2402, and/or memory 2404 of consumer device 104. In some embodiments, a calendar display screen may be provided to facilitate the consumer input of a time period to be used in the search criteria. One such example of a calendar interface screen is shown with respect to FIG. 11. FIG. 11 illustrates an exemplary calendar interface screen associated with a consumer device 104 allowing a consumer to indicate a time period to use in defining the promotion search criteria.

At block 206, a map may be accessed and provided to the consumer in an interface display, for example, using means such as display 2410, input/output interfaces 2408, communications interface 2406, processor 2402, and/or memory 2404 of consumer device 104. In some embodiments, the current location of the consumer may be used to determine the region of the map to be displayed to the consumer. In some embodiments, the consumer may provide location parameters to determine the region of the map to be displayed (e.g., a country, region, state, etc.).

At block 208, the consumer may indicate a region of the displayed map that should be used to define the search criteria, for example, using means such as input/output interfaces 2408, display 2410, processor 2402, and/or memory 2404 of consumer device 104. In some embodiments, the consumer may draw a circle, or some other shape or partial shape, on the display to circumscribe a region of the displayed map. For example, in some embodiments, the consumer device may comprise a touch screen display and the consumer may use a finger, stylus, or the like to draw a shape circumscribing the desired region on the touchscreen display. In other embodiments, the consumer may use a pointing device, such as a computer mouse, to circumscribe the desired region of the map. One such example of a drawing tool is shown with respect to FIG. 10. FIG. 10 illustrates an exemplary input screen associated with a consumer device 104 allowing a consumer to circumscribe a map region to use in defining the promotion search criteria.

Alternatively or additionally, and as noted above, other images, geographical data, or other indications of places or activities may be displayed instead of or in conjunction with a map. In other examples, multiple circles or other shapes may be input by a consumer to indicate multiple search areas, the overlap of the circles or other shapes may comprise the search area, or each of the areas may be searched. In other examples, multiple consumers may be searching together (e.g., planning a group travel experience) and an overlap area of the areas input by the multiple consumers may be searched, each of the areas input by each of the consumers may be searched, and/or the like.

At block 210, the consumer may then initiate a search such that the Promotion and Marketing Service system may then search for promotions available within the circumscribed region and available for redemption during the indicated time period. At block 212, the Promotion and Marketing Service system may generate an impression comprising one or more promotions found in the search and the impression may then be presented to the consumer, such as illustrated in FIG. 12. In some examples, the impression may include promotions from one or more channels, such as from travel, experiences, goods, services, and/or the like. As such, the consumer may arrange, for example, for travel, lodging, and meals in one application.

In some embodiments, the application may allow for the promotion search interface to be shared by multiple consumers on their individual devices such that each consumer may provide input of a circumscribed region on the displayed map. In such an embodiment, the location search criteria may be defined by combining the individual circumscribed regions and setting the search location as the area of overlap of the combined circumscribed regions, by searching each of the circumscribed regions of each of the multiple consumers, or the like.

FIG. 3 illustrates another flowchart of exemplary operations for a process 300 that may be executed by one or more apparatuses to facilitate consumer searching for available promotions, in accordance with some example embodiments discussed herein. Operations of process 300 may begin at block 302 upon a consumer launching an application associated with a Promotion and Marketing Service system (e.g., Promotion and Marketing Service system 102) via a consumer device (e.g., consumer device 104). One such example of an initial launch screen is shown with respect to FIG. 5. FIG. 5 illustrates an exemplary initial launch screen for an application facilitating consumer searches for travel-related promotions.

At block 304, consumer input of a promotion category to be used in the search criteria may be received, for example, using means such as input/output interfaces 2408, display 2410, processor 2402, and/or memory 2404 of consumer device 104. For example, in some embodiments, the consumer may be provided with a display of categories reflection different types of travel opportunities to select from, such as ski, beach, outdoors, family, romantic, and the like. Such categories are shown with respect to FIG. 6. FIG. 6 illustrates an exemplary input screen associated with a consumer device 104 allowing a consumer to indicate a promotion category to use in defining the promotion search criteria.

At block 306, consumer input of a time period may be received, such as a specific date, date range, or type of period (e.g. weekend), to be used in searching for available promotions, for example, using means such as input/output interfaces 2408, display 2410, processor 2402, and/or memory 2404 of consumer device 104. In some embodiments, a calendar display screen may be provided to facilitate the consumer input of a time period to be used in the search criteria. One such example of a calendar interface screen is shown with respect to FIG. 11. FIG. 11 illustrates an exemplary calendar interface screen associated with a consumer device 104 allowing a consumer to indicate a time period to use in defining the promotion search criteria.

At block 308, consumer input of an indication to use a "Draw Map" interface to input location search criteria may be received, for example, using means such as input/output interfaces 2408, display 2410, processor 2402, and/or memory 2404 of consumer device 104. One such example of an input screen to select a "Draw Map" interface is shown with respect to FIG. 9. FIG. 9 illustrates an exemplary input screen associated with a consumer device 104 allowing a consumer to indicate a desire to draw on a map to indicate the location to use in defining the promotion search criteria. In some embodiments, a consumer may provide the indication by selecting a button, field, indicator, or the like, such as indicator 902 of FIG. 9. At block 310, a map may be accessed and provided to the consumer in an interface display screen. In some embodiments, the current location of the consumer may be used to determine the section of the map to be displayed to the consumer. In some embodiments, the consumer may provide location parameters to determine the section of the map to be displayed (e.g., a country, region, state, etc.).

At block 312, consumer input may be received to indicate a region of the displayed map that should be used to define the search criteria, for example, using means such as input/output interfaces 2408, display 2410, processor 2402, and/or memory 2404 of consumer device 104. In some embodiments, the consumer may draw a circle, or some other shape or partial shape, on the display to circumscribe a region of the map. For example, in some embodiments, the consumer device may comprise a touch screen display and the consumer may use a finger, stylus, or the like to draw a shape circumscribing the desired region on the touchscreen display. In other embodiments, the consumer may use a pointing device, such as a computer mouse, to circumscribe the desired region of the map. One such example of a drawing tool is shown with respect to FIG. 10. FIG. 10 illustrates an exemplary input screen associated with a consumer device 104 allowing a consumer to circumscribe a map region to use in defining the promotion search criteria, with circumscribed region 1002 being indicated.

At block 314, a plurality of coordinate points on the boundary of the circumscribed region may be determined. At block 316, location search criteria may be defined as being the area of the map within the plurality of coordinate points.

At block 318, the consumer may then initiate a search such that the Promotion and Marketing Service system may then search for promotions available within the circumscribed region and that are within the indicated category and available for redemption during the indicated time period. At block 320, the Promotion and Marketing Service system may generate an impression comprising one or more promotions found in the search and the impression may then be presented to the consumer, such as illustrated in FIG. 12.

FIGS. 4A-4B illustrate flowcharts describing example operations for storing searches and providing alerts for promotions meeting search criteria in accordance with some example embodiments discussed herein FIG. 4A illustrates a flowchart of exemplary operations that may be executed by one or more apparatuses to facilitate consumer searching for available promotions including saving search criteria for further use, in accordance with some example embodiments discussed herein. Operations may begin at block 402 upon a consumer launching an application associated with a Promotion and Marketing Service system (e.g., Promotion and Marketing Service system 102) via a consumer device (e.g., consumer device 104). One such example of an initial launch screen is shown with respect to FIG. 5. FIG. 5 illustrates an exemplary initial launch screen for an application facilitating consumer searches for travel-related promotions.

At block 404, consumer input of a promotion category to be used in the search criteria may be received. For example, in some embodiments, the consumer may be provided with a display of categories reflection different types of travel opportunities to select from, such as ski, beach, outdoors, family, romantic, and the like. Such categories are shown with respect to FIG. 6. FIG. 6 illustrates an exemplary input screen associated with a consumer device 104 allowing a consumer to indicate a promotion category to use in defining the promotion search criteria.

At block 406, consumer input of a time period may be received, such as a specific date, date range, or type of period (e.g. weekend), to be used in searching for available promotions. In some embodiments, a calendar display screen may be provided to facilitate the consumer input of a time period to be used in the search criteria.

At block 408, consumer input of an indication to use a "Draw Map" interface to input location search criteria may be received. At block 410, a map may be accessed and provided to the consumer in an interface display screen. In some embodiments, the current location of the consumer may be used to determine the section of the map to be displayed to the consumer. In some embodiments, the consumer may provide location parameters to determine the section of the map to be displayed (e.g., a country, region, state, etc.).

At block 412, consumer input may be received to indicate a region of the displayed map that should be used to define the search criteria. In some embodiments, the consumer may draw a circle, or some other shape, on the display to circumscribe a region of the map. For example, in some embodiments, the consumer device may comprise a touch screen display and the consumer may use a finger, stylus, or the like to draw a shape circumscribing the desired region on the touchscreen display. In other embodiments, the consumer may use a pointing device, such as a computer mouse, to circumscribe the desired region of the map. One such example of a drawing tool is shown with respect to FIG. 10. FIG. 10 illustrates an exemplary input screen associated with a consumer device 104 allowing a consumer to circumscribe a map region to use in defining the promotion search criteria.

Figure 13:
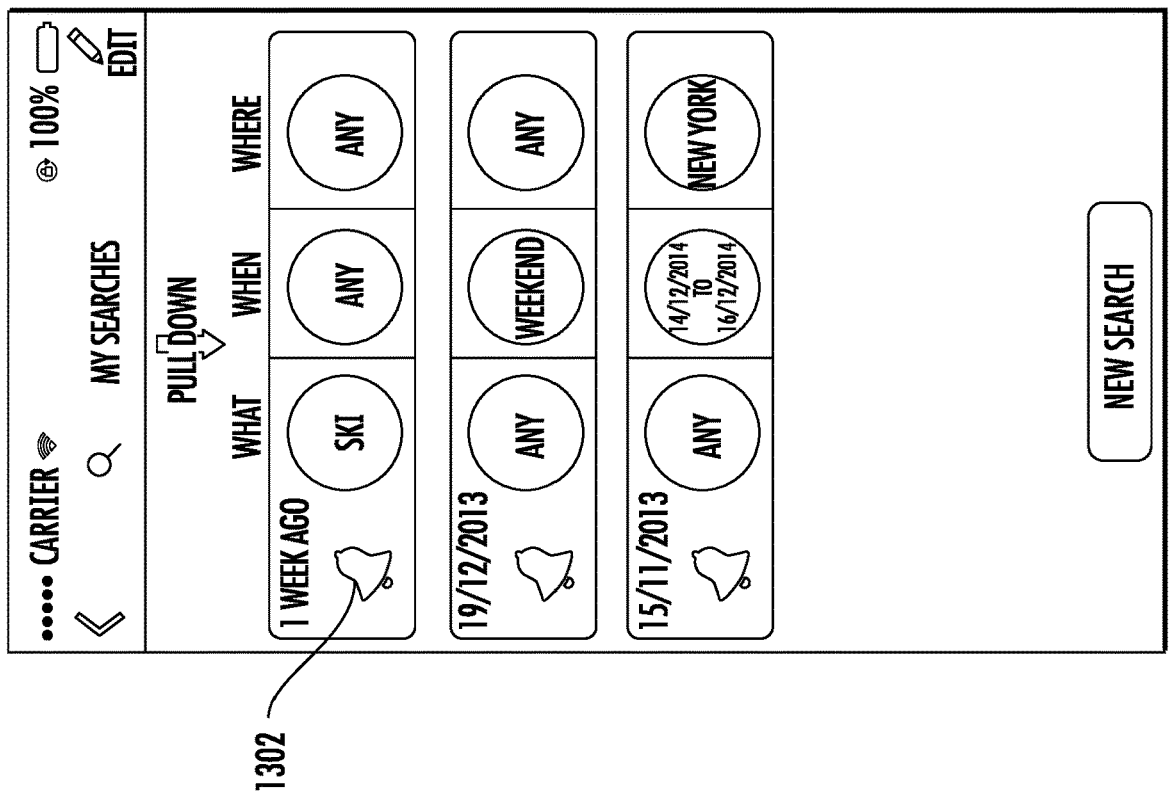

At block 414, the Promotion and Marketing Service system may then search for promotions available within the circumscribed region and that are within the indicated category and available for redemption during the indicated time period. At block 416, consumer input may be received to indicate that the current search criteria should be saved. At block 418, the search criteria may be stored and associated with the consumer, for example as part of a consumer profile or consumer account. One such example of a saved search display screen is shown with respect to FIG. 13. FIG. 13 illustrates an exemplary screen associated with a consumer device 104 displaying a plurality of previously stored searches for a consumer.

FIG. 4B illustrates a flowchart of exemplary operations that may be executed by one or more apparatuses to facilitate consumer searching for available promotions including alerting a consumer when stored search criteria is met, in accordance with some example embodiments discussed herein. Operations illustrated in FIG. 4B may occur after a consumer has defined promotion search criteria and saved the search criteria, such as described in relation to FIG. 4A. In some embodiments, a consumer may be provided the option to set up alerts for the stored search criteria as part of the operations for storing the search criteria. In some embodiments, a consumer may be provided the option to select previously stored search criteria and establish or edit alerts for the selected stored search criteria.

Figure 14:
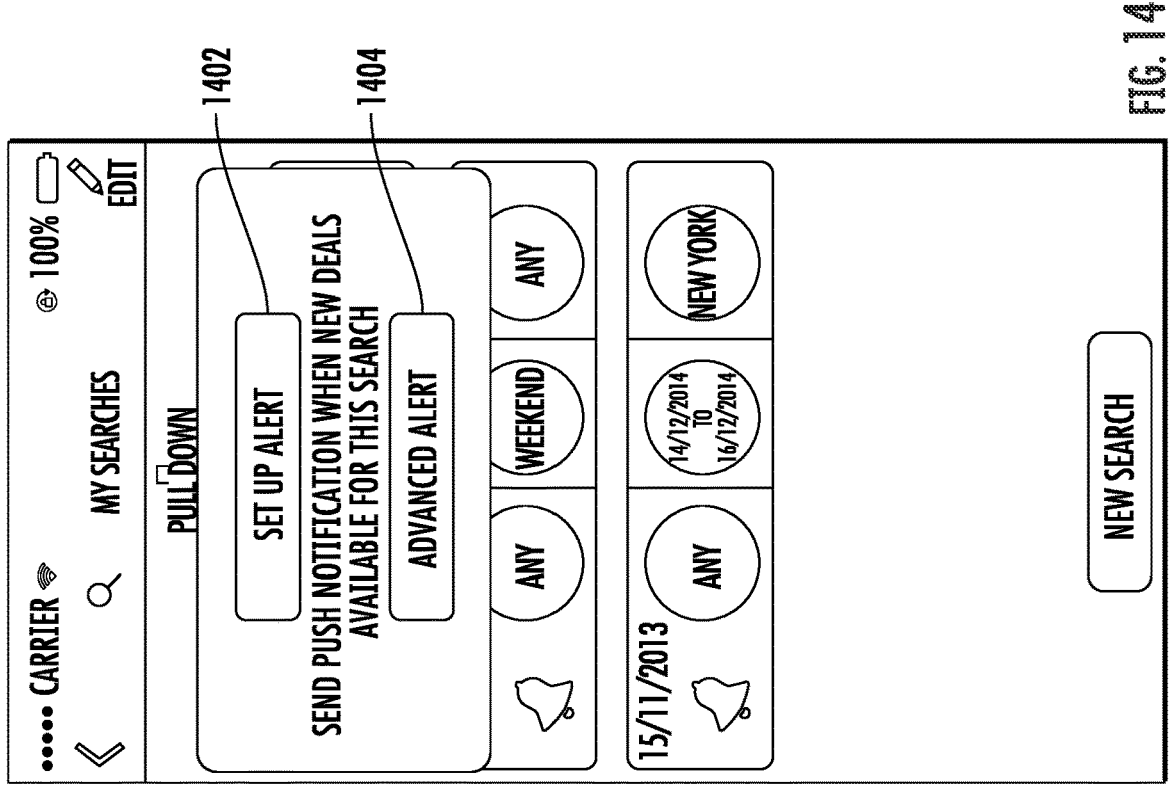

Operations may begin at block 422 where consumer input may be received to establish alert parameters for stored search criteria. In some embodiments, a consumer may be able to set up a basic level of alerts whereby an alert notification may be generated when a new promotion that matches the search criteria becomes available. For example, an alert notification may comprise a push notification, email message, or the like, comprising an impression with one or more promotions. In some embodiments, a consumer may be provided the ability to establish advanced alerts whereby the consumer may establish additional parameters for an alert notification to be generated. For example, a consumer may be able to set an alert trigger whereby an alert notification may be provided when a promotion meeting the search criteria and that is below a threshold dollar amount is available, e.g., when a promotion is below $200. Some examples of alert setting screens are shown with respect to FIGS. 13 and 14. FIGS. 13 and 14 illustrate exemplary screens for establishing alerts for new or previously saved searches for a consumer. For example, in some embodiments, a consumer may select an indicator, such as alert indicator 1302, to establish or edit alerts for particular stored search criteria. After receiving a selection of alert indicator 1402, an alert setup interface may be displayed, such that a consumer may indicate to use a basic alert by selecting button 1402 or to establish more advanced alert parameters by selecting button 1404.

At block 424, the Promotion and Marketing Service system may then search for promotions using the stored search criteria. At block 426, a determination is made if any promotions returned as search results meet the criteria for the defined alert parameters. If no promotions in the results meet the alert parameters, operations may return to block 426 and wait for a next iteration of the search to be performed. If at block 426, a determination is made that one or more promotions meet the alert parameters, the Promotion and Marketing Service system may generate an impression at block 428 comprising one or more promotions found in the search and a notification may be provided to the consumer, such as a push notification, a message comprising the impression, or the like, such that the impression may then be presented to the consumer.

FIG. 5 illustrates an example interface that may be provided on a consumer device to access the functionality of Promotion and Marketing Service system application, such as a travel application. The interface may allow for a consumer to search for promotions using various methods, as described herein.

FIGS. 6-8 illustrate example interfaces that may be provided on a consumer device to provide search criteria input capabilities, such as allowing a consumer to indicate search criteria for what type of promotions, a time period for promotions, and a location for promotions.

FIG. 9 illustrates an exemplary input screen allowing a consumer to indicate a desire to draw on a map display to indicate the location to use in defining the promotion search criteria. For example, a consumer may select a button, indicator, or field, such as indicator 902, on the interface to indicate that a map should be displayed to allow input of a search region. FIG. 10 illustrates an exemplary input screen allowing a consumer to circumscribe a map region to use in defining the promotion search criteria, such as circumscribed region 1002.

FIG. 11 illustrates an exemplary calendar interface screen allowing a consumer to select a desired time period for use in the search criteria. In some embodiments, the calendar interface may allow a consumer to select a specific date, one or more date ranges, a set number of days within a date range, a particular type of time period such as weekends or holidays, and/or the like.

FIG. 12 illustrates an exemplary display screen presenting an impression with one or more promotions returned as a result of the search. The interface illustrated in FIG. 12 may provide functionality for a consumer to select a promotion and receive additional details regarding the promotion, such as illustrated in FIG. 19.

FIGS. 13 and 14 illustrate exemplary screens for displaying a consumer's stored search criteria and for establishing alerts for a consumer using stored search criteria.

Figure 15:
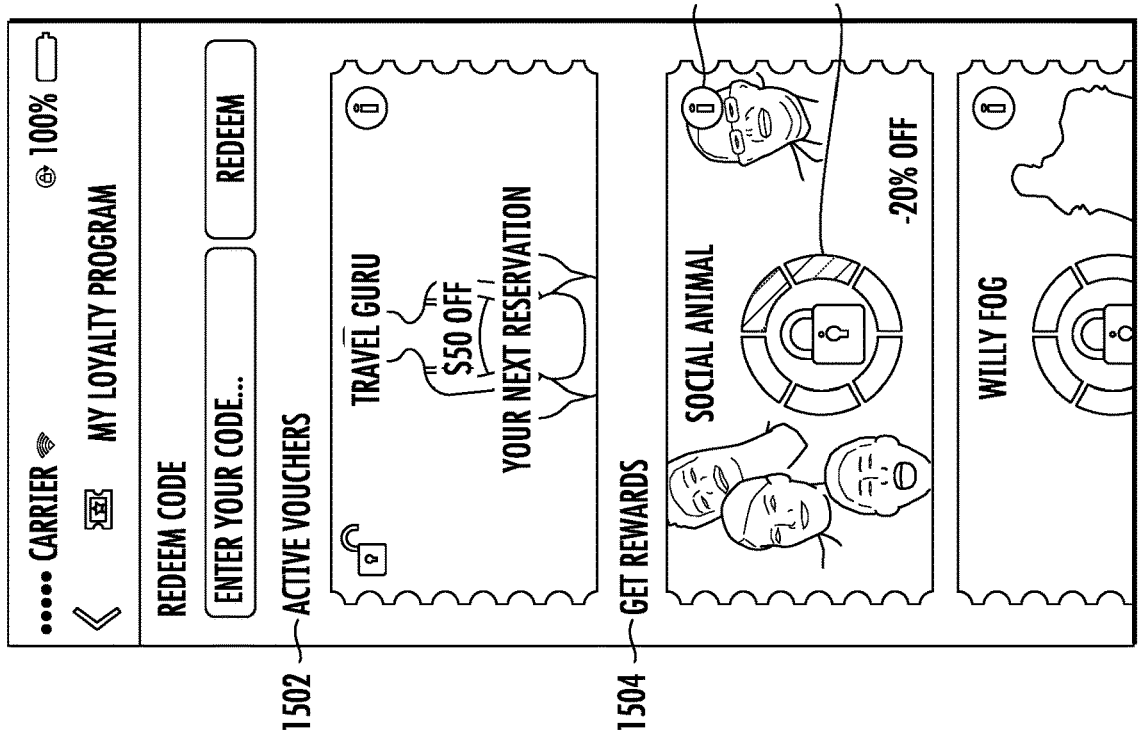

FIGS. 15-18 illustrate exemplary interface screens that may allow for a consumer loyalty program in accordance with some embodiments of the present invention. FIG. 15 illustrates an example of an initial loyalty program display screen. The loyalty program display screen may allow for a consumer to redeem loyalty program promotional codes that have been provided to the consumer, view active loyalty program promotional instruments that the consumer has earned, and provide an indication of the consumer's status regarding particular levels within a loyalty program.

In some embodiments, a consumer may earn rewards in the loyalty program by completing a certain number or series of tasks or actions. For example, as illustrated in Active Vouchers section 1502, a "Travel Guru" reward instrument may have been activated or unlocked by the consumer completing certain actions, such as providing recommendations, comments in a travel guide, or the like.

In some embodiments, the loyalty program display screen may display different reward levels that can be activated or unlocked by the consumer completing certain actions or tasks, such as in Get Rewards section 1504. In some embodiments, the loyalty program display screen may display the consumer's progress in completing the requirements to unlock a certain reward level, such as status icon 1508. In some embodiments, the loyalty program display screen may provide for details associated with a reward level to be displayed upon a consumer clicking an icon, such as information icon 1506. Upon a consumer selection information icon 1506, a reward level detail screen, such as detail screen 1602 of FIG. 16, may be displayed.

Figure 16:
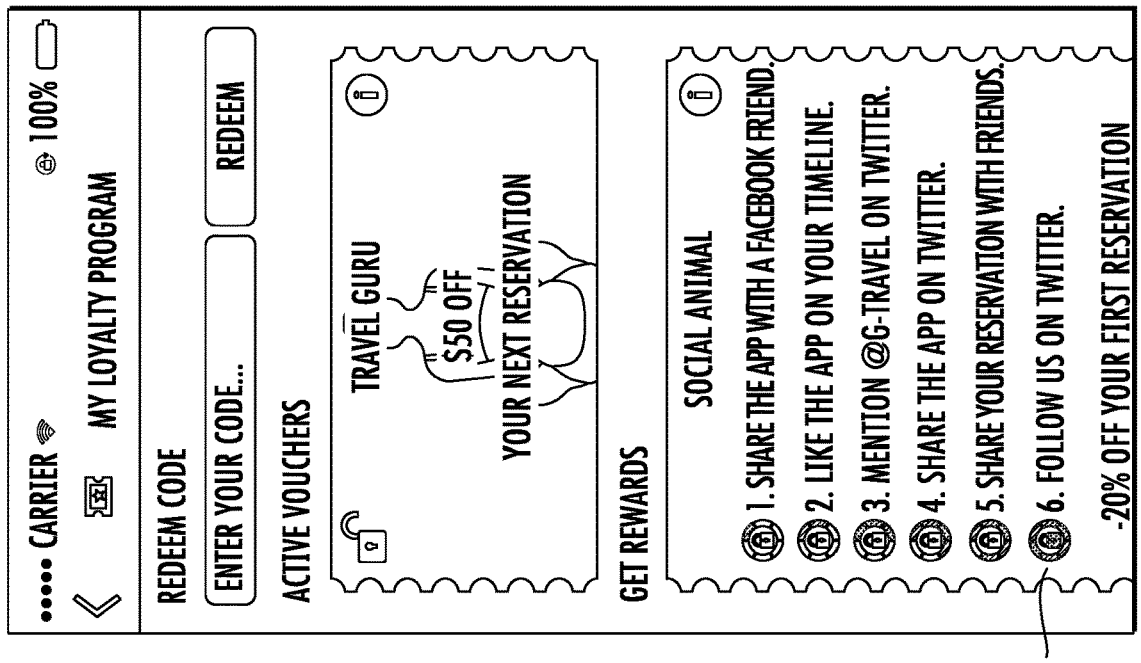

FIG. 16 illustrates another example of a loyalty program display screen where the information regarding the required actions or tasks to unlock a reward level is displayed.

Figure 18:
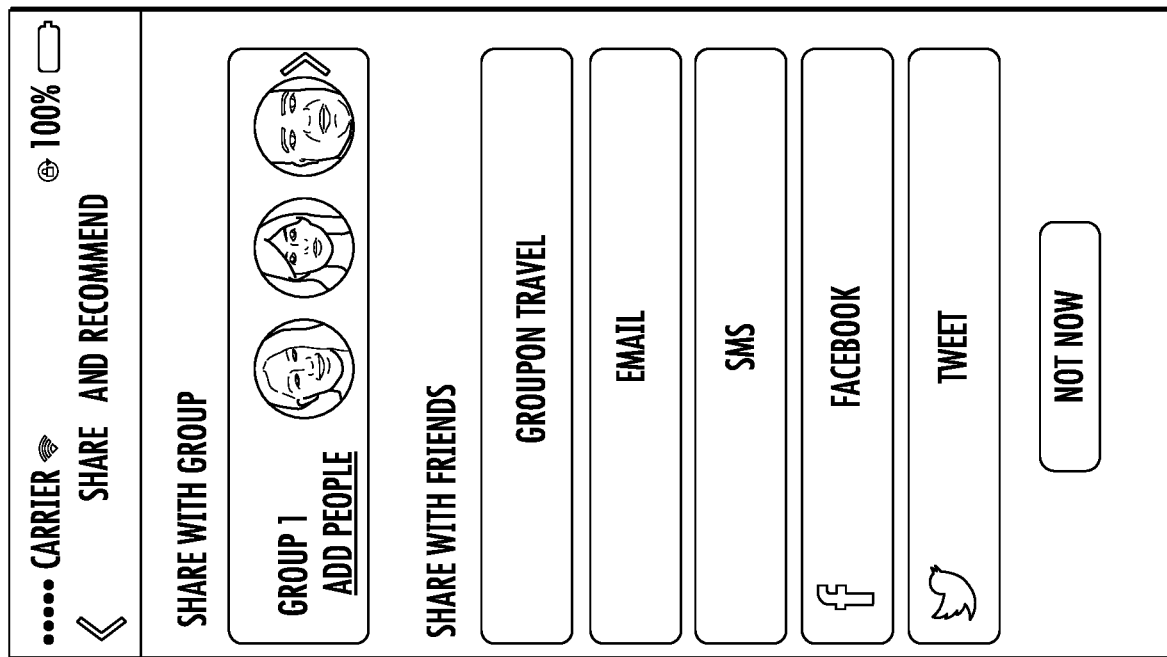
Figure 17:
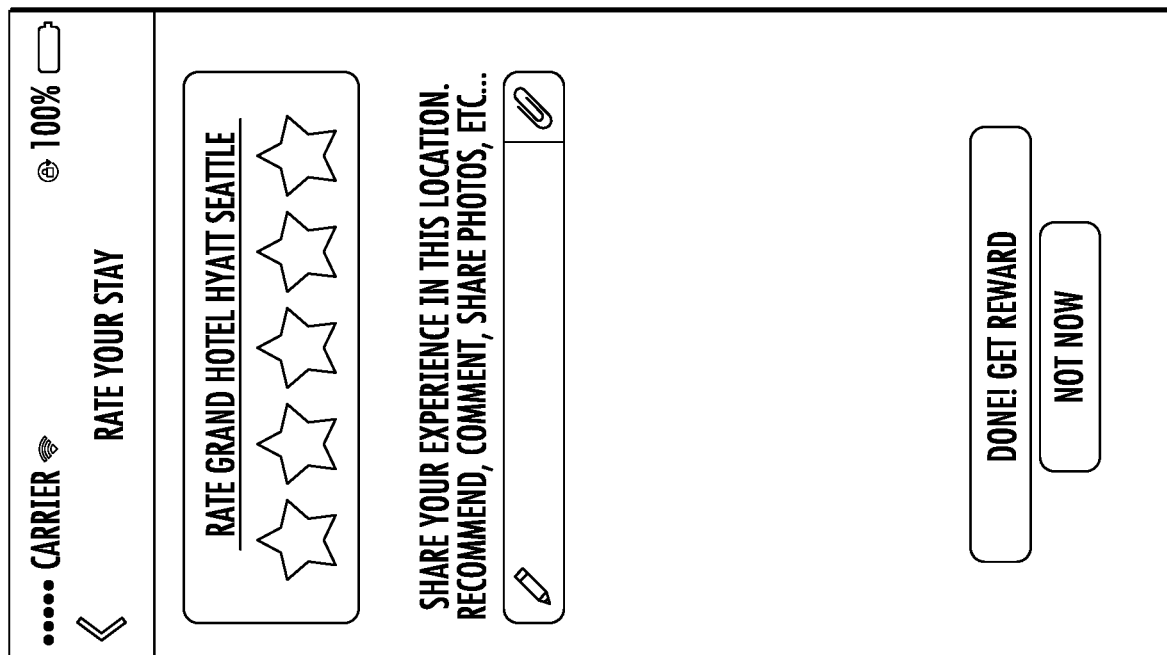
Figure 21:
Figure 22:
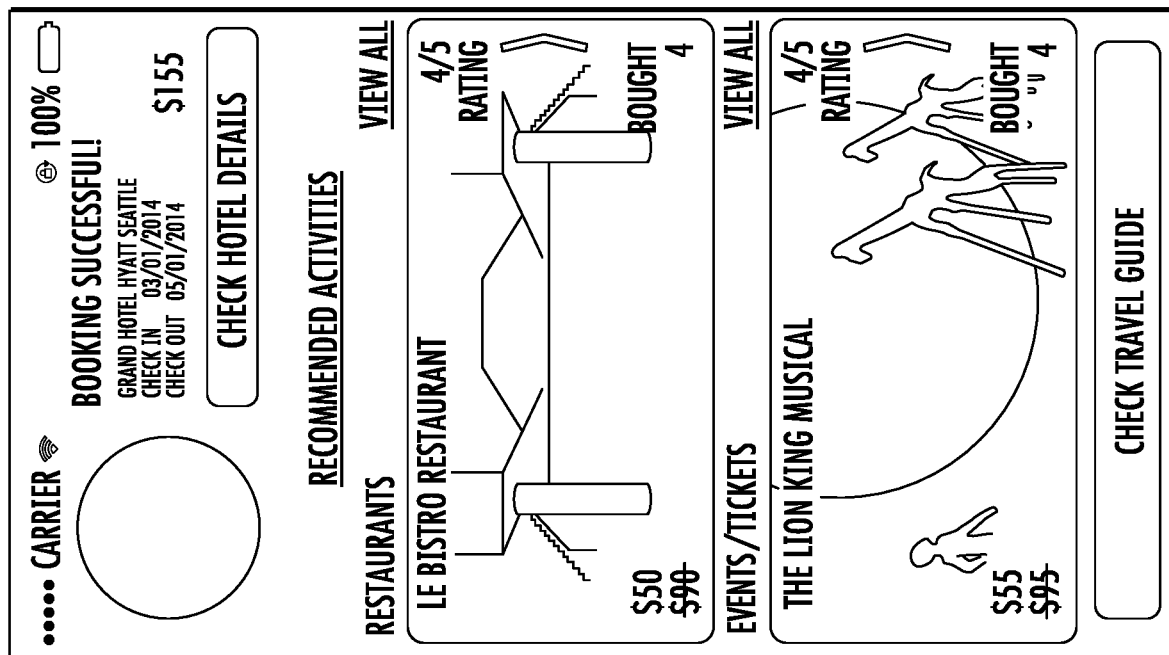

FIG. 17 illustrates an exemplary interface screen for entering ratings and comments regarding a travel or promotion experience, which may be an action to be completed as part of the loyalty program. FIG. 18 illustrates an exemplary interface screen for sharing information via social networks regarding a travel or promotion experience, which may be an action to be completed as part of the loyalty program.

FIGS. 19-23 illustrate exemplary display screens as part of a travel promotion selection and purchase process. Once an impression comprising one or more promotions has been provided to a consumer, such as described herein, the consumer may select a particular promotion to receive additional details on the promotion, such as illustrated in FIG. 19. For example, in some embodiments, a consumer may be presented with a brief summary of information about the promotion, such as hotel information and pictures for a lodging promotion. The consumer may also be provided the ability to see ratings, recommendations, comments, and the like for the promotion provider. In some embodiments, the consumer may be able to view activities that may be associated with the promotion, for example local goods, services, events, or restaurants near a hotel. In some embodiments, the consumer may be able to share information about the promotion with friends or groups, such as via social media applications. In some embodiments, the consumer may be able to view other travel information associated with the promotion, such as viewing flights to and from airports near a hotel.

In some embodiments, once a consumer has selected a particular promotion, such as a hotel promotion, a calendar may be displayed to allow the consumer to select dates of their stay or the like, as illustrated in FIG. 20. In some embodiments, the calendar display may indicate what dates are available for redemption of the promotion and only allow the consumer to select dates within those available periods. In some embodiments, once the consumer has selected the dates for the travel promotion, the consumer may be provide a series of screens to complete and confirm the purchase, such as FIGS. 21 and 22, where the consumer may enter their personal and payment information. In some embodiments, once the consumer has completed the purchase process, a confirmation display may be presented with a summary of the promotion purchase, as illustrated in FIG. 23. The confirmation display may also include recommendations for promotions for restaurants, services, activities, goods, or the like, which may be associated with the travel.

FIG. 24 shows a block diagram of apparatus 2400, some or all of which may be included in, for example, a promotion and marketing service system 102, and/or consumer device 104. As illustrated in FIG. 24, in accordance with some example embodiments, apparatus 2400 can include various means, such as one or more processors 2402, memories 2404, communications interfaces 2406, input/output interfaces 2408, and/or display 2410. In this regard, the means of apparatus 2400 as described herein may be embodied as, for example, circuitry, hardware elements (e.g., a suitably programmed processor, combinational logic circuit, and/or the like), a computer program product comprising computer-readable program instructions stored on a non-transitory computer-readable medium that is executable by a suitably configured processing device (e.g., processor 2402), or some combination thereof.

Apparatus 2400 may be specially configured to execute instructions and provide functions in accordance with example embodiments of the invention disclosed herein. For example, apparatus 2400 may be suitably configured for such using means such as computer-readable program instructions stored in one or more memories 2404, stored on one or more non-transitory computer-readable medium, and/or the like.

Processor 2402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 24 as a single processor, in some embodiments, processor 2402 comprises a plurality of processors. The plurality of processors may be embodied on a single computing device or may be distributed across a plurality of computing devices collectively configured to function as apparatus 2400. The plurality of processors may be in operative communication with each other and may be collectively configured to perform one or more functionalities of apparatus 2400 as described herein. In an example embodiment, processor 2402 is configured to execute instructions stored in memory 2404 or otherwise accessible to processor 2402, such as instructions stored on a non-transitory computer-readable medium. These instructions, when executed by processor 2402, may cause apparatus 2400 to perform one or more of the functionalities of the embodiments as described herein.

Whether configured by hardware, firmware/software methods, or by a combination thereof, processor 2402 may comprise an entity capable of performing operations according to embodiments of the present invention while configured accordingly. Thus, for example, when processor 2402 is embodied as an ASIC, FPGA, or the like, processor 2402 may comprise specifically configured hardware for conducting one or more operations described herein. As another example, when processor 2402 is embodied as an executor of instructions, such as may be stored in memory 2404, the instructions may specifically configure processor 2402 to perform one or more algorithms and operations described herein, such as those discussed in connection with FIGS. 2-4B.

Memory 2404 may comprise, for example, volatile memory, non-volatile memory, or some combination thereof. Although illustrated in FIG. 24 as a single memory, memory 2404 may comprise a plurality of memory components. The plurality of memory components may be embodied on a single computing device or distributed across a plurality of computing devices. In various embodiments, memory 2404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2404 may be configured to store information, data, applications, instructions, or the like for enabling apparatus 2400 to carry out various functions in accordance with example embodiments of the present invention. For example, in at least some embodiments, memory 2404 is configured to buffer input data for processing by processor 2402. Additionally or alternatively, in at least some embodiments, memory 2404 is configured to store program instructions for execution by processor 2402. Memory 2404 may store information in the form of static and/or dynamic information. This stored information may be stored and/or used by apparatus 2400 during the course of performing its functionalities.

Communications interface 2406 may be embodied as any device or means embodied in circuitry, hardware, a computer program product comprising computer readable program instructions stored on a computer readable medium (e.g., memory 2404) and executed by a processing device (e.g., processor 2402), or a combination thereof that is configured to receive and/or transmit data from/to another device, such as, for example, a second apparatus 2400 and/or the like. In some embodiments, communications interface 2406 (like other components discussed herein) can be at least partially embodied as or otherwise controlled by processor 2402. In this regard, communications interface 2406 may be in communication with processor 2402, such as via a bus. Communications interface 2406 may include, for example, an antenna, a transmitter, a receiver, a transceiver, network interface card and/or supporting hardware and/or firmware/software for enabling communications with another computing device. Communications interface 2406 may be configured to receive and/or transmit any data that may be stored by memory 2404 using any protocol that may be used for communications between computing devices. Communications interface 2406 may additionally or alternatively be in communication with the memory 2404, input/output interfaces 2408, and/or any other component of apparatus 2400, such as via a bus.

Input/output interfaces 2408 may be in communication with processor 2402 to receive an indication of a user input and/or to provide an audible, visual, mechanical, or other output to a user (e.g., a consumer). Some example visual outputs that may be provided to a user by apparatus 2400 are discussed in connection with FIGS. 5-23. As such, input/output interfaces 2408 may include support, for example, for a keyboard, a mouse, a joystick, a display, a touch screen display, a microphone, a speaker, a RFID reader, barcode reader, biometric scanner, and/or other input/output mechanisms. In embodiments wherein apparatus 2400 is embodied as a server or database, aspects of input/output interfaces 2408 may be reduced as compared to embodiments where apparatus 2400 is implemented as an end-user machine (e.g., a consumer device) or other type of device designed for complex user interactions. In some embodiments (like other components discussed herein), input/output interfaces 2408 may even be eliminated from apparatus 2400. Input/output interfaces 2408 may be in communication with the memory 2404, communications interface 2406, and/or any other component(s), such as via a bus. Although more than one input/output interface and/or other component can be included in apparatus 2400, only one is shown in FIG. 24 to avoid overcomplicating the drawing (like the other components discussed herein).

In some embodiments, some or all of the functionality for facilitating consumer interactions with Marketing and Promotion Service systems such as consumer searching for promotions may be performed by processor 2402. In this regard, the example processes and algorithms discussed herein can be performed by at least one processor 2402. For example, non-transitory computer readable storage media can be configured to store firmware, one or more application programs, and/or other software, which include instructions and other computer-readable program code portions that can be executed to control each processor (e.g., processor 2402) of the components of system 100 to implement various operations, including the examples shown above. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems, and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 2402 discussed above with reference to FIG. 24, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 2404) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims.

That which is claimed:

1. An apparatus comprising a processor and a non-transitory memory storing program instructions, wherein the non-transitory memory and the program instructions are configured to, with the processor, cause the apparatus to:
   retrieve stored search criteria, wherein the stored search criteria comprise a search region and a search date;
   cause display of an alert establishment interface associated with the stored search criteria, wherein the alert establishment interface is configured to enable user editing or selection of alert parameters associated with the stored search criteria;
   receive at least one alert parameter associated with the stored search criteria based on user engagement with the alert establishment interface;
   transmit a search query based on the stored search criteria;
   receive a plurality of search responses based on the search query;
   determine that the at least one alert parameter is met based on:
      monitoring a current location of a first client device; and
      determining that the current location of the first client device is within the search region; and
   in response to determining that the at least one alert parameter is met, generate an impression comprising the plurality of search responses.

2. The apparatus of claim 1, wherein the non-transitory memory and the program instructions are configured to, with the processor, cause the apparatus to:
   cause display of a shared map interface on the first client device and on a second client device;
   receive clickstream data from the first client device and the second client device; and
   access the shared map interface based on receiving location parameters from the first client device and the second client device.

3. The apparatus of claim 2, wherein the shared map interface is based on the current location of the first client device.

4. The apparatus of claim 2, wherein the non-transitory memory and the program instructions are configured to, with the processor, cause the apparatus to:

receive input comprising the search date from the first client device via a network;

receive a first shape drawing input that is indicative of first location data on the shared map interface displayed on the first client device, wherein the first client device is associated with a first consumer profile;

generate a first circumscribed region on the shared map interface of the first client device and the second client device based on the first shape drawing input and the first location data;

receive a second shape drawing input that is indicative of second location data on the shared map interface displayed on the second client device, wherein the second client device is associated with a second consumer profile; and generate a second circumscribed region on the shared map interface of the first client device and the second client device based on the second shape drawing input and the second location data.

5. The apparatus of claim 4, wherein the non-transitory memory and the program instructions are configured to, with the processor, cause the apparatus to:

determine the search region based on the first circumscribed region and the second circumscribed region, wherein the search region is only an overlapping region of the first circumscribed region and the second circumscribed region;

receive input comprising a promotion category from a plurality of promotion categories from the first client device via the network;

receive an indication to store search criteria comprising the search region, the search date, and the promotion category from the first client device via the network; and store the search criteria.

6. The apparatus of claim 1, wherein the non-transitory memory and the program instructions are configured to, with the processor, cause the apparatus to:

provide the impression to the first client device via a network and through a push notification.

7. The apparatus of claim 1, wherein the impression comprises one or more promotions that are redeemable within the search region on the search date.

8. A computer-implemented method comprising:

retrieving stored search criteria, wherein the stored search criteria comprise a search region and a search date;

causing display of an alert establishment interface associated with the stored search criteria, wherein the alert establishment interface is configured to enable user editing or selection of alert parameters associated with the stored search criteria;

receiving at least one alert parameter associated with the stored search criteria based on user engagement with the alert establishment interface;

transmitting a search query based on the stored search criteria;

receiving a plurality of search responses based on the search query;

determining that the at least one alert parameter is met based on:
monitoring a current location of a first client device, and
determining that the current location of the first client device is within the search region; and in response to determining that the at least one alert parameter is met, generating an impression comprising the plurality of search responses.

9. The computer-implemented method of claim 8, further comprising:

causing display of a shared map interface on the first client device and on a second client device;

receiving clickstream data from the first client device and the second client device; and accessing the shared map interface based on receiving location parameters from the first client device and the second client device.

10. The computer-implemented method of claim 9, wherein the shared map interface is based on the current location of the first client device.

11. The computer-implemented method of claim 9, further comprising:

receiving input comprising the search date from the first client device via a network;

receiving a first shape drawing input that is indicative of first location data on the shared map interface displayed on the first client device, wherein the first client device is associated with a first consumer profile;

generating a first circumscribed region on the shared map interface of the first client device and the second client device based on the first shape drawing input and the first location data;

receiving a second shape drawing input that is indicative of second location data on the shared map interface displayed on the second client device, wherein the second client device is associated with a second consumer profile; and generating a second circumscribed region on the shared map interface of the first client device and the second client device based on the second shape drawing input and the second location data.

12. The computer-implemented method of claim 11, further comprising:

determining the search region based on the first circumscribed region and the second circumscribed region, wherein the search region is only an overlapping region of the first circumscribed region and the second circumscribed region;

receiving input comprising a promotion category from a plurality of promotion categories from the first client device via the network;

receiving an indication to store search criteria comprising the search region, the search date, and the promotion category from the first client device via the network; and storing the search criteria.

13. The computer-implemented method of claim 8, further comprising:

providing the impression to the first client device via a network and through a push notification.

14. The computer-implemented method of claim 8, wherein the impression comprises one or more promotions that are redeemable within the search region on the search date.

15. A computer program product comprising at least one non-transitory computer-readable storage medium having computer-readable program code portions stored therein, the computer-readable program code portions comprising an executable portion configured to:

retrieve stored search criteria, wherein the stored search criteria comprise a search region and a search date;

cause display of an alert establishment interface associated with the stored search criteria, wherein the alert establishment interface is configured to enable user editing or selection of alert parameters associated with the stored search criteria;

receive at least one alert parameter associated with the stored search criteria based on user engagement with the alert establishment interface;

transmit a search query based on the stored search criteria;

receive a plurality of search responses based on the search query;

determine that the at least one alert parameter is met for one or more search responses of the plurality of search responses based on:

monitoring a current location of a first client device, and determining that the current location of the first client device is within the search region; and in response to determining that the at least one alert parameter is met, generate an impression comprising the plurality of search responses.

16. The computer program product of claim 15, wherein the computer-readable program code portions comprise the executable portion configured to:

cause display of a shared map interface on the first client device and on a second client device;

receive clickstream data from the first client device and the second client device; and access the shared map interface based on receiving location parameters from the first client device and the second client device.

17. The computer program product of claim 16, wherein the shared map interface is based on the current location of the first client device.

18. The computer program product of claim 16, wherein the computer-readable program code portions comprise the executable portion configured to:

receive input comprising the search date from the first client device via a network;

receive a first shape drawing input that is indicative of first location data on the shared map interface displayed on the first client device, wherein the first client device is associated with a first consumer profile;

generate a first circumscribed region on the shared map interface of the first client device and the second client device based on the first shape drawing input and the first location data;

receive a second shape drawing input that is indicative of second location data on the shared map interface displayed on the second client device, wherein the second client device is associated with a second consumer profile; and generate a second circumscribed region on the shared map interface of the first client device and the second client device based on the second shape drawing input and the second location data.

19. The computer program product of claim 18, wherein the computer-readable program code portions comprise the executable portion configured to:

determine the search region based on the first circumscribed region and the second circumscribed region, wherein the search region is only an overlapping region of the first circumscribed region and the second circumscribed region;

receive input comprising a promotion category from a plurality of promotion categories from the first client device via the network;

receive an indication to store search criteria comprising the search region, the search date, and the promotion category from the first client device via the network; and store the search criteria.

20. The computer program product of claim 15, wherein the computer-readable program code portions comprise the executable portion configured to:

provide the impression to the first client device via a network and through a push notification.

\* \* \* \* \*